US010117086B2

(12) United States Patent
Vanderveen et al.

(10) Patent No.: US 10,117,086 B2
(45) Date of Patent: Oct. 30, 2018

(54) SHARING OF PROXIMATE DISCOVERY ANNOUNCEMENTS IN A WIRELESS COMMUNICATIONS NETWORK

(71) Applicant: QUALCOMM Incorporated, San Diego, CA (US)

(72) Inventors: Michaela Vanderveen, Tracy, CA (US); Georgios Tsirtsis, London (GB)

(73) Assignee: QUALCOMM Incorporated, San Diego, CA (US)

( * ) Notice: Subject to any disclaimer, the term of this patent is extended or adjusted under 35 U.S.C. 154(b) by 213 days.

(21) Appl. No.: 14/620,627

(22) Filed: Feb. 12, 2015

(65) Prior Publication Data
US 2016/0242019 A1 Aug. 18, 2016

(51) Int. Cl.
*H04W 8/24* (2009.01)
*H04W 8/00* (2009.01)
*H04J 11/00* (2006.01)
*H04W 4/21* (2018.01)
*H04L 29/08* (2006.01)
*H04W 4/20* (2018.01)
*H04W 88/04* (2009.01)

(52) U.S. Cl.
CPC .......... *H04W 8/005* (2013.01); *H04J 11/0086* (2013.01); *H04L 67/16* (2013.01); *H04L 67/2819* (2013.01); *H04W 4/20* (2013.01); *H04W 4/21* (2018.02); *H04W 88/04* (2013.01)

(58) Field of Classification Search
CPC ..... H04J 11/0086; H04L 67/16; H04W 4/005; H04W 4/206; H04W 88/04; H04W 8/005
See application file for complete search history.

(56) References Cited

U.S. PATENT DOCUMENTS 8,260,331 B2 9/2012 Wormald et al.
8,554,627 B2 10/2013 Svendsen et al.
8,594,632 B1 11/2013 Azizi et al.
(Continued)

FOREIGN PATENT DOCUMENTS

WO 2014152618 A2 9/2014

OTHER PUBLICATIONS

"3rd Generation Partnership Project; Technical Specification Group Services and System Aspects; Proximity-based services (ProSe); Stage 2 (Release 12)," 3GPP Standard; 3GPP TS 23.303, 3rd Generation Partnership Project (3GPP), Mobile Competence Centre ; 650, Route Des Lucioles ; F-06921 Sophia-Antipolis.
(Continued)

*Primary Examiner* — Asad M Nawaz
*Assistant Examiner* — Zhaohui Yang
(74) *Attorney, Agent, or Firm* — MG-IP Law, P.C.

(57) ABSTRACT

Systems and methods are disclosed for sharing a discovery. The method may include receiving a first announcement from an announcement device, receiving a share instruction indicating that the received announcement is of interest to the user of the mobile device; generating discovery sharing data based on the received first announcement in response to the share instruction, transmitting the discovery sharing data to an external server, receiving an update indicator from the external server indicating that the metadata associated with the mobile device has been updated, and generating a second announcement associated with the mobile device based on the update indicator.

28 Claims, 12 Drawing Sheets

(56) References Cited

U.S. PATENT DOCUMENTS

| | | | |
|---|---|---|---|
| 2005/0044165 A1* | 2/2005 | O'Farrell | G06Q 10/10 |
| | | | 709/213 |
| 2010/0010899 A1 | 1/2010 | Lambert et al. | |
| 2013/0246138 A1* | 9/2013 | Johnson | G06Q 30/02 |
| | | | 705/14.16 |
| 2013/0332849 A1 | 12/2013 | Santos | |
| 2014/0022986 A1 | 1/2014 | Wu et al. | |
| 2014/0126460 A1* | 5/2014 | Bienas | H04W 74/002 |
| | | | 370/315 |
| 2014/0129346 A1 | 5/2014 | Brun et al. | |
| 2014/0274031 A1 | 9/2014 | Menendez | |
| 2015/0223048 A1* | 8/2015 | Al-Shalash | H04W 8/005 |
| | | | 370/254 |
| 2016/0092918 A1* | 3/2016 | Cha | G06Q 30/0251 |
| | | | 705/14.55 |

OTHER PUBLICATIONS

International Search Report and Written Opinion—PCT/US2016/015007—ISA/EPO—dated Apr. 13, 2016.
Qualcomm Incorporated: "Metadata Upload for Open and Restricted Discovery," 3GPP Draft; S2-150116-EPROSE-METADATA-UPLOAD, 3rd Generation Partnership Project (3GPP), Mobile Competence Centre; 650, Route Des Lucioles; F-06921 Sophia-Antipolis Cedex; France, vol. SA WG2, No. Sorrento, Italy; Jan. 26, 2015.

* cited by examiner

SHARING OF PROXIMATE DISCOVERY ANNOUNCEMENTS IN A WIRELESS COMMUNICATIONS NETWORK

Aspects of this disclosure relate generally to proximate discovery in a wireless communications network, and more particularly to systems and methods for sharing the results of proximate discoveries.

In recent years, usage of direct peer-to-peer (P2P) communications has increased. Long Term Evolution Direct (LTE-D) is a proposed Third Generation Partnership Project (3GPP), Release 12 solution for proximate discovery. LTE-D dispenses with location tracking and network calls by directly monitoring for services on other LTE-D devices within a large range (~500 m, line of sight). It does so continuously in a synchronous system that is battery efficient, and can concurrently detect thousands of services in proximity.

LTE-D operates on licensed spectrum as an operator service to mobile applications. LTE-D enables service layer discovery. Mobile applications on LTE-D-enabled devices can instruct the LTE-D component to monitor for mobile application services on other devices. Moreover, mobile applications on LTE-D devices can instruct the LTE-D component to announce their own services for detection by other proximate LTE-D devices at the physical layer. The applications can be closed while LTE-D works continuously, and notifies the client application when it detects a match to the set monitor.

LTE-D is thus an attractive alternative to mobile developers seeking to deploy proximate discovery solutions as extensions of their existing cloud services. LTE-D is a distributed discovery solution (versus the centralized discovery that exists today), whereby mobile applications forego centralized database processing in identifying relevancy matches, instead autonomously determining relevance at the device level by transmitting and monitoring for relevant attributes. LTE-D offers certain benefits in terms of privacy as well as power consumption, in that LTE-D does not utilize perpetual location tracking to determine proximity. By keeping discovery on the device rather than in the cloud, the user has more control of what information is shared with external devices.

SUMMARY

In one aspect, the present disclosure provides a method for a mobile device to share a discovery. The method may comprise, for example, receiving a first announcement from an announcement device, receiving a share instruction indicating that the received announcement is of interest to the user of the mobile device; generating discovery sharing data based on the received first announcement in response to the share instruction, transmitting the discovery sharing data to an external server, receiving an update indicator from the external server indicating that the metadata associated with the mobile device has been updated, and generating a second announcement associated with the mobile device based on the update indicator.

In another aspect, the present disclosure provides a mobile device for sharing a discovery. The mobile device may comprise, for example, a processor configured to receive a first announcement from an announcement device, receive a share instruction indicating that the received announcement is of interest to the user of the mobile device, generate discovery sharing data based on the received first announcement in response to the share instruction, transmit the discovery sharing data to an external server, receive an update indicator from the external server indicating that the metadata associated with the mobile device has been updated, and generate a second announcement associated with the mobile device based on the update indicator, and a memory, coupled to the processor, to store related data and instructions.

In yet another aspect, the present disclosure provides an apparatus for sharing a discovery. The apparatus may comprise, for example, means for receiving a first announcement from an announcement device, means for receiving a share instruction indicating that the received announcement is of interest to the user of the mobile device, means for generating discovery sharing data based on the received first announcement in response to the share instruction, means for transmitting the discovery sharing data to an external server, means for receiving an update indicator from the external server indicating that the metadata associated with the mobile device has been updated, and means for generating a second announcement associated with the mobile device based on the update indicator.

In yet another aspect, the present disclosure provides a non-transitory computer-readable medium comprising code, which, when executed by a processor, causes the processor to perform operations for sharing a discovery. The non-transitory computer-readable medium may comprise, for example, code for receiving a first announcement from an announcement device, code for receiving a share instruction indicating that the received announcement is of interest to the user of the mobile device, code for generating discovery sharing data based on the received first announcement in response to the share instruction, code for transmitting the discovery sharing data to an external server, code for receiving an update indicator from the external server indicating that the metadata associated with the mobile device has been updated, and code for generating a second announcement associated with the mobile device based on the update indicator.

BRIEF DESCRIPTION OF THE DRAWINGS

A more complete appreciation of embodiments of the invention and many of the attendant advantages thereof will be readily obtained as the same becomes better understood by reference to the following detailed description when considered in connection with the accompanying drawings which are presented solely for illustration and not limitation of the invention, and in which.

DETAILED DESCRIPTION

Figure 1:
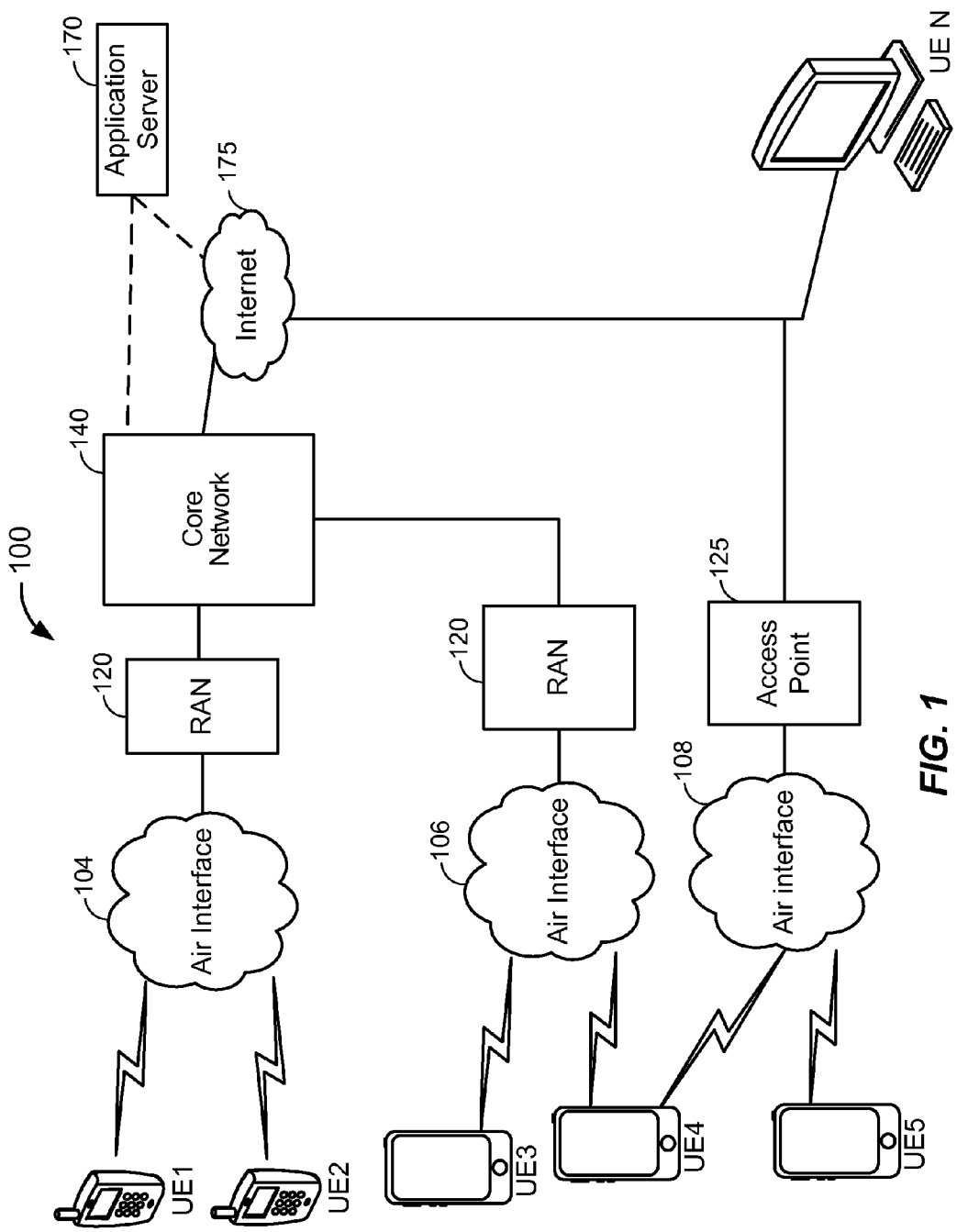
FIG. 1 generally illustrates a high-level system architecture of a wireless communications system in accordance with an aspect of the disclosure.

Aspects of the invention are disclosed in the following description and related drawings directed to specific embodiments of the invention. Alternate embodiments may be devised without departing from the scope of the invention. Additionally, well-known elements of the invention will not be described in detail or will be omitted so as not to obscure the relevant details of the invention. The words "exemplary" and/or "example" are used herein to mean "serving as an example, instance, or illustration." Any embodiment described herein as "exemplary" and/or "example" is not necessarily to be construed as preferred or advantageous over other embodiments Likewise, the term "embodiments of the invention" does not require that all embodiments of the invention include the discussed feature, advantage or mode of operation. Further, many embodiments are described in terms of sequences of actions to be performed by, for example, elements of a computing device. It will be recognized that various actions described herein can be performed by specific circuits (e.g., application specific integrated circuits (ASICs)), by program instructions being executed by one or more processors, or by a combination of both. Additionally, these sequence of actions described herein can be considered to be embodied entirely within any form of computer readable storage medium having stored therein a corresponding set of computer instructions that upon execution would cause an associated processor to perform the functionality described herein. Thus, the various aspects of the invention may be embodied in a number of different forms, all of which have been contemplated to be within the scope of the claimed subject matter. In addition, for each of the embodiments described herein, the corresponding form of any such embodiments may be described herein as, for example, "logic configured to" perform the described action.

A client device, referred to herein as a user equipment (UE), may be mobile or stationary, and may communicate with a radio access network (RAN). As used herein, the term "UE" may be referred to interchangeably as an "access terminal" or "AT", a "wireless device", a "subscriber device", a "subscriber terminal", a "subscriber station", a "user terminal" or UT, a "mobile terminal", a "mobile station" and variations thereof. Generally, UEs can communicate with a core network via the RAN, and through the core network the UEs can be connected with external networks such as the Internet. Of course, other mechanisms of connecting to the core network and/or the Internet are also possible for the UEs, such as over wired access networks, Wi-Fi networks (e.g., based on IEEE 802.11, etc.) and so on. UEs can be embodied by any of a number of types of devices including but not limited to PC cards, compact flash devices, external or internal modems, wireless or wireline phones or tablets, and so on. A communication link through which UEs can send signals to the RAN is called an uplink channel (e.g., a reverse traffic channel, a reverse control channel, an access channel, etc.). A communication link through which the RAN can send signals to UEs is called a downlink or forward link channel (e.g., a paging channel, a control channel, a broadcast channel, a forward traffic channel, etc.). As used herein the term traffic channel (TCH) can refer to either an uplink/reverse or downlink/forward traffic channel.

FIG. 1 illustrates a high-level system architecture of a wireless communications system 100 in accordance with an embodiment of the invention. The wireless communications system 100 contains UEs 1 . . . N. The UEs 1 . . . N can include cellular telephones, personal digital assistant (PDAs), pagers, a laptop computer, a desktop computer, and so on. For example, in FIG. 1, UEs 1 . . . 2 are illustrated as cellular calling phones, UEs 3 . . . 5 are illustrated as cellular touchscreen phones or smart phones, and UE N is illustrated as a desktop computer or PC.

Referring to FIG. 1, UEs 1 . . . N are configured to communicate with an access network (e.g., the RAN 120, an access point 125, etc.) over a physical communications interface or layer, shown in FIG. 1 as air interfaces 104, 106, 108 and/or a direct wired connection. The air interfaces 104 and 106 can comply with a given cellular communications protocol (e.g., CDMA, EVDO, eHRPD, GSM, EDGE, W-CDMA, LTE, etc.), while the air interface 108 can comply with a wireless IP protocol (e.g., IEEE 802.11). The RAN 120 includes a plurality of access points that serve UEs over air interfaces, such as the air interfaces 104 and 106. The access points in the RAN 120 can be referred to as access nodes or ANs, access points or APs, base stations or BSs, Node Bs, eNode Bs, and so on. These access points can be terrestrial access points (or ground stations), or satellite access points. The RAN 120 is configured to connect to a core network 140 that can perform a variety of functions, including bridging circuit switched (CS) calls between UEs served by the RAN 120 and other UEs served by the RAN 120 or a different RAN altogether, and can also mediate an exchange of packet-switched (PS) data with external networks such as Internet 175. The Internet 175 includes a number of routing agents and processing agents (not shown in FIG. 1 for the sake of convenience). In FIG. 1, UE N is shown as connecting to the Internet 175 directly (i.e., separate from the core network 140, such as over an Ethernet connection of Wi-Fi or 802.11-based network). The Internet 175 can thereby function to bridge packet-switched data communications between UE N and UEs 1 . . . N via the core network 140. Also shown in FIG.1 is the access point 125 that is separate from the RAN 120. The access point 125 may be connected to the Internet 175 independent of the core network 140 (e.g., via an optical communication system such as FiOS, a cable modem, etc.). The air interface 108 may serve UE 4 or UE 5 over a local wireless connection, such as IEEE 802.11 in an example. UE N is shown as a desktop computer with a wired connection to the Internet 175, such as a direct connection to a modem or router, which can correspond to the access point 125 itself in an example (e.g., for a Wi-Fi router with both wired and wireless connectivity).

Referring to FIG. 1, an application server 170 is shown as connected to the Internet 175, the core network 140, or both. The application server 170 can be implemented as a plurality of structurally separate servers, or alternately may correspond to a single server. As will be described below in more detail, the application server 170 is configured to support one or more communication services (e.g., Voice-over-Internet Protocol (VoIP) sessions, Push-to-Talk (PTT) sessions, group communication sessions, social networking services, etc.) for UEs that can connect to the application server 170 via the core network 140 and/or the Internet 175.

An example of a protocol-specific implementations for the RAN 120 and the core network 140 is provided below in FIG. 2 to help explain the wireless communications system 100 in more detail. In particular, the components of the RAN 120 and the core network 140 correspond to components associated with supporting packet-switched (PS) communications. Legacy circuit-switched (CS) components may also be present in these networks, but any legacy CS-specific components are not shown explicitly in FIG. 2.

Figure 2:
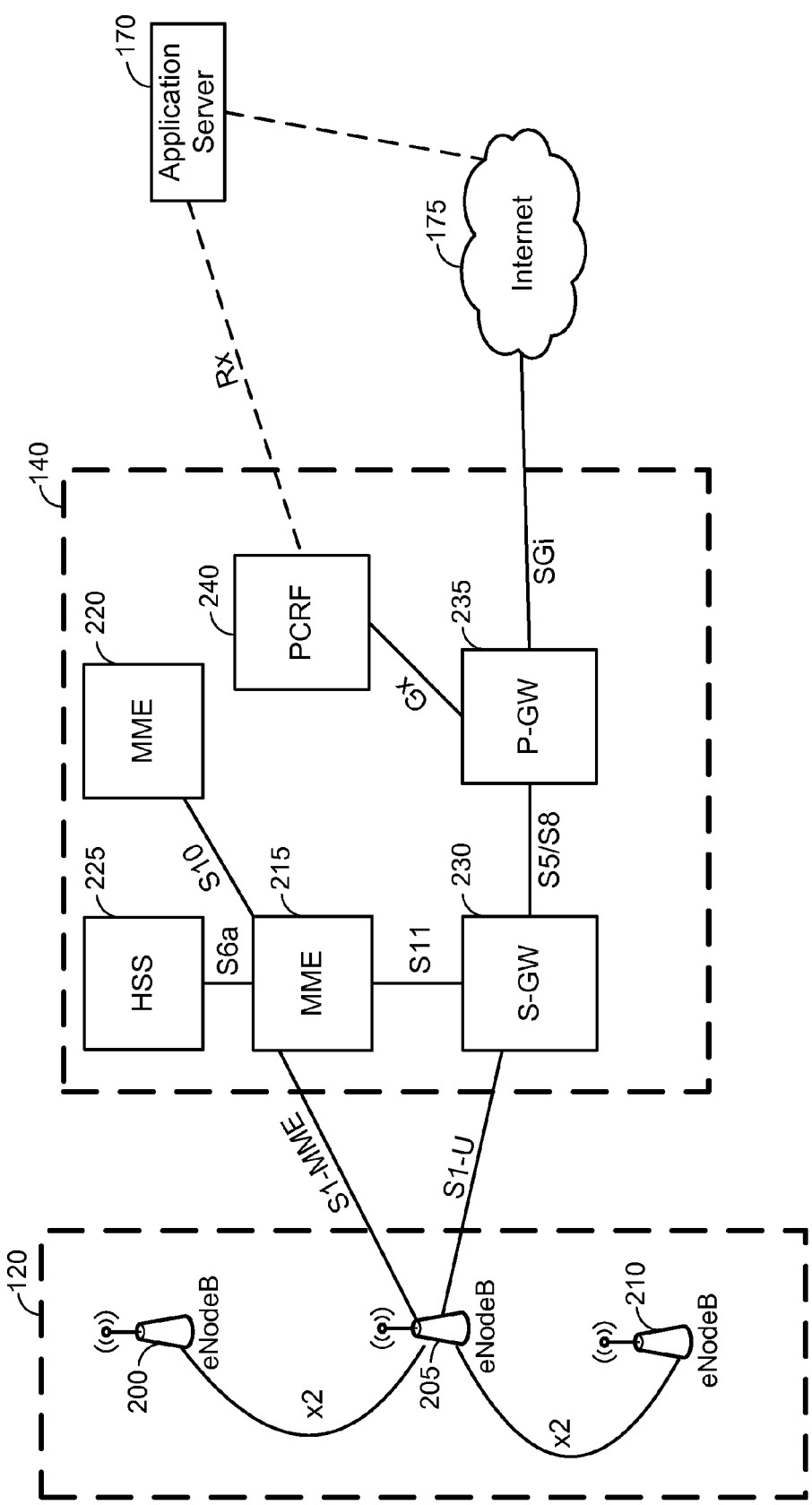
FIG. 2 illustrates an example configuration of the RAN and a packet-switched portion of the core network that is based on an Evolved Packet System (EPS) or Long Term Evolution (LTE) network in accordance with an aspect of the disclosure.

FIG. 2 illustrates an example configuration of the RAN 120 and a packet-switched portion of the core network 140 based on an Evolved Packet System (EPS) or LTE network, in accordance with an embodiment of the invention. The RAN 120 in the EPS/LTE network is configured with a plurality of Evolved Node Bs (ENodeBs or eNBs) 200, 205 and 210. ENodeBs in EPS/LTE networks generally do not require a separate controller within the RAN 120 to communicate with the core network 140.

In FIG. 2, the core network 140 includes a plurality of Mobility Management Entities (MMEs) 215 and 220, a Home Subscriber Server (HSS) 225, a Serving Gateway (S-GW) 230, a Packet Data Network Gateway (P-GW) 235 and a Policy and Charging Rules Function (PCRF) 240. Network interfaces between these components, the RAN 120 and the Internet 175 are illustrated in FIG. 2 and are defined in Table 1 (below) as follows:

TABLE 1

| Network Interface | Description |
| --- | --- |
| S1-MME | Reference point for the control plane protocol between RAN 120 and MME 215. |
| S1-U | Reference point between RAN 120 and S-GW 230 for the per bearer user plane tunneling and inter-eNodeB path switching during handover. |
| S5 | Provides user plane tunneling and tunnel management between S-GW 230 and P-GW 235. It is used for S-GW relocation due to UE mobility and if the S-GW 230 needs to connect to a non-collocated P-GW for the required PDN connectivity. |
| S6a | Enables transfer of subscription and authentication data for authenticating/authorizing user access to the evolved system (Authentication, Authorization, and Accounting [AAA] interface) between MME 215 and HSS 225. |
| Gx | Provides transfer of Quality of Service (QoS) policy and charging rules from PCRF 240 to Policy a Charging Enforcement Function (PCEF) component (not shown) in the P-GW 235. |
| S8 | Inter-PLMN reference point providing user and control plane between the S-GW 230 in a Visited public Land Mobile Network (VPLMN) and the P-GW 235 in a Home public Land Mobile Network (HPLMN). S8 is the inter-PLMN variant of S5. |
| S10 | Reference point between MMEs 215 and 220 for MME relocation and MME to MME information transfer. |
| S11 | Reference point between MME 215 and S-GW 230. |
| SGi | Reference point between the P-GW 235 and the packet data network, shown in FIG. 2 as the Internet 175. The Packet data network may be an operator external public or private packet data network or an intra-operator packet data network (e.g., for provision of IMS services). This reference point corresponds to Gi for 3 GPP accesses. |
| X2 | Reference point between two different eNodeBs used for UE handoffs. |
| Rx | Reference point between the PCRF 240 and an application function (AF) that is used to exchanged application-level session information, where the AF is represented in FIG. 1 by the application server 170. |

A high-level description of the components shown in the RAN 120 and core network 140 of FIG. 2 will now be described. However, these components are each well-known in the art from various 3GPP TS standards, and the description contained herein is not intended to be an exhaustive description of all functionalities performed by these components.

Referring to FIG. 2, the MMEs 215 and 220 are configured to manage the control plane signaling for the EPS bearers. MME functions include: Non-Access Stratum (NAS) signaling, NAS signaling security, Mobility management for inter- and intra-technology handovers, P-GW and S-GW selection, and MME selection for handovers with MME change.

Referring to FIG. 2, the S-GW 230 is the gateway that terminates the interface toward the RAN 120. For each UE associated with the core network 140 for an EPS-based system, at a given point of time, there is a single S-GW. The functions of the S-GW 230, for both the GTP-based and the Proxy Mobile IPv6 (PMIP)-based S5/S8, include: Mobility anchor point, Packet routing and forwarding, and setting the DiffServ Code Point (DSCP) based on a QoS Class Identifier (QCI) of the associated EPS bearer.

Referring to FIG. 2, the P-GW 235 is the gateway that terminates the SGi interface toward the Packet Data Network (PDN), e.g., the Internet 175. If a UE is accessing multiple PDNs, there may be more than one P-GW for that UE; however, a mix of S5/S8 connectivity and Gn/Gp connectivity is not typically supported for that UE simultaneously. P-GW functions include for both the GTP-based S5/S8: Packet filtering (by deep packet inspection), UE IP address allocation, setting the DSCP based on the QCI of the associated EPS bearer, accounting for inter operator charging, uplink (UL) and downlink (DL) bearer binding as defined in 3GPP TS 23.203, UL bearer binding verification as defined in 3GPP TS 23.203. The P-GW 235 provides PDN connectivity to both GSM/EDGE Radio Access Network (GERAN)/UTRAN only UEs and E-UTRAN-capable UEs using any of E-UTRAN, GERAN, or UTRAN. The P-GW 235 provides PDN connectivity to E-UTRAN capable UEs using E-UTRAN only over the S5/S8 interface.

Referring to FIG. 2, the PCRF 240 is the policy and charging control element of the EPS-based core network 140. In a non-roaming scenario, there is a single PCRF in the HPLMN associated with a UE's Internet Protocol Connectivity Access Network (IP-CAN) session. The PCRF terminates the Rx interface and the Gx interface. In a roaming scenario with local breakout of traffic, there may be two PCRFs associated with a UE's IP-CAN session: A Home PCRF (H-PCRF) is a PCRF that resides within a HPLMN, and a Visited PCRF (V-PCRF) is a PCRF that resides within a visited VPLMN. PCRF is described in more detail in 3GPP TS 23.203, and as such will not be described further for the sake of brevity. In FIG. 2, the application server 170 (e.g., which can be referred to as the AF in 3GPP terminology) is shown as connected to the core network 140 via the Internet 175, or alternatively to the PCRF 240 directly via an Rx interface. Generally, the application server 170 (or AF) is an element offering applications that use IP bearer resources with the core network (e.g. UMTS PS domain/GPRS domain resources/LTE PS data services). One example of an application function is the Proxy-Call Session Control Function (P-CSCF) of the IP Multimedia Subsystem (IMS) Core Network sub system. The AF uses the Rx reference point to provide session information to the PCRF 240. Any other application server offering IP data services over cellular network can also be connected to the PCRF 240 via the Rx reference point.

Figure 3:
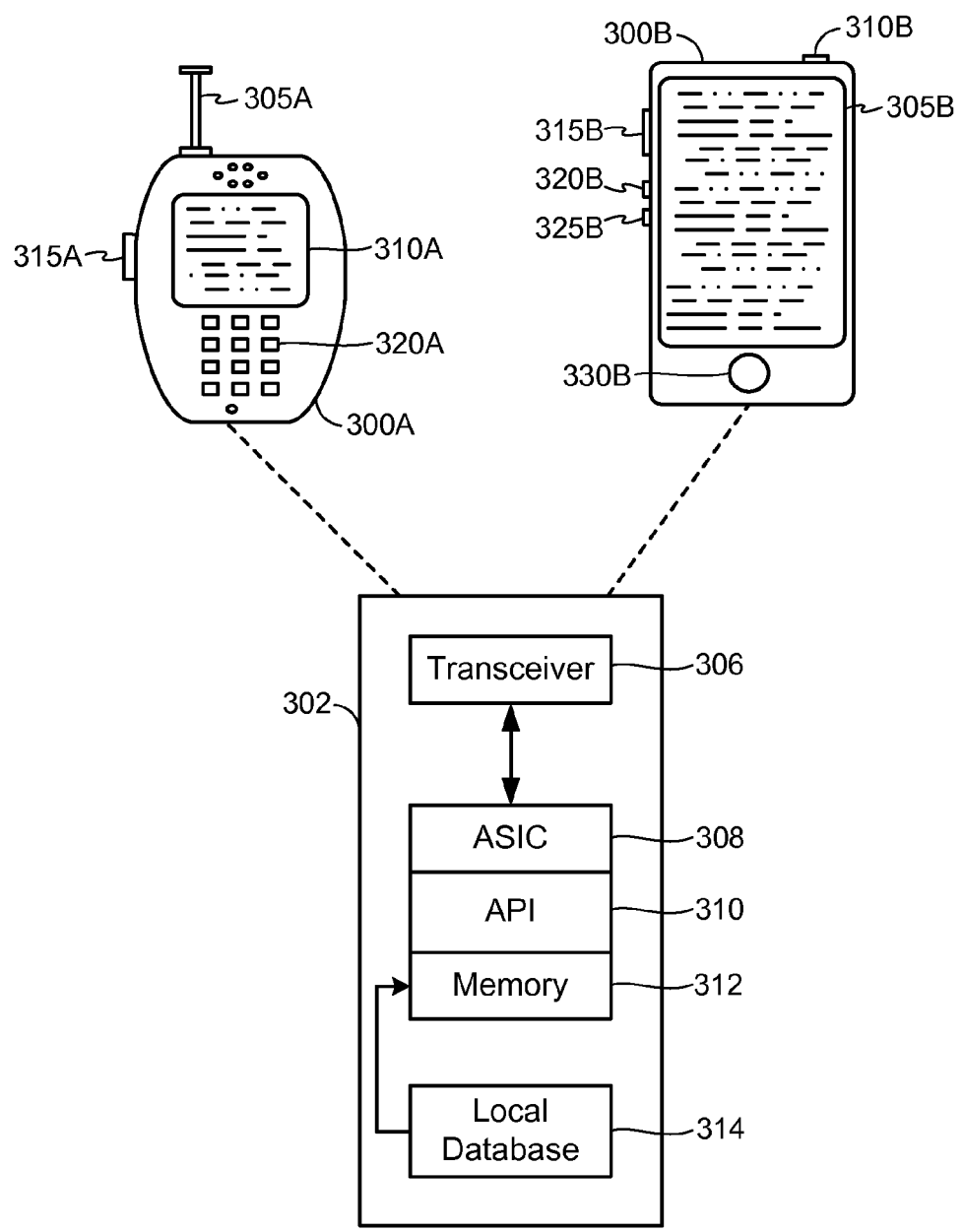
FIG. 3 illustrates examples of user equipments (UEs) in accordance with aspects of the disclosure.

FIG. 3 illustrates examples of UEs in accordance with embodiments of the invention. Referring to FIG. 3, UE 300A is illustrated as a calling telephone and UE 300B is illustrated as a touchscreen device (e.g., a smart phone, a tablet computer, etc.). As shown in FIG. 3, an external casing of UE 300A is configured with an antenna 305A, display 310A, at least one button 315A (e.g., a PTT button, a power button, a volume control button, etc.) and a keypad 320A among other components, as is known in the art. Also, an external casing of UE 300B is configured with a touchscreen display 305B, peripheral buttons 310B, 315B, 320B and 325B (e.g., a power control button, a volume or vibrate control button, an airplane mode toggle button, etc.), at least one front-panel button 330B (e.g., a Home button, etc.), among other components, as is known in the art. Each of UE 300A and UE 300B includes one or more user interface components through which a user of the UE 300A or UE 300B interacts with the device, for example, button 315A, touchscreen display 305B, etc. The user of the UE 300A or UE 300B can provide input or instructions to the device via one or more of the user interface components, and the device can provide output or notifications to the user via one or more of the user interface components. While not shown explicitly as part of UE 300B, the UE 300B can include one or more external antennas and/or one or more integrated antennas that are built into the external casing of UE 300B, including but not limited to Wi-Fi antennas, cellular antennas, satellite position system (SPS) antennas (e.g., global positioning system (GPS) antennas), and so on.

While internal components of UEs such as the UEs 300A and 300B can be embodied with different hardware configurations, a basic high-level UE configuration for internal hardware components is shown as platform 302 in FIG. 3. The platform 302 can receive and execute software applications, data and/or commands transmitted from the RAN 120 that may ultimately come from the core network 140, the Internet 175 and/or other remote servers and networks (e.g., application server 170, web URLs, etc.). The platform 302 can also independently execute locally stored applications without RAN interaction. The platform 302 can include a transceiver 306 operably coupled to an application specific integrated circuit (ASIC) 308, or other processor, microprocessor, logic circuit, or other data processing device. The ASIC 308 or other processor executes the application programming interface (API) 310 layer that interfaces with any resident programs in the memory 312 of the wireless device. The memory 312 can be comprised of read-only or random-access memory (RAM and ROM), EEPROM, flash cards, or any memory common to computer platforms. The platform 302 also can include a local database 314 that can store applications not actively used in memory 312, as well as other data. The local database 314 is typically a flash memory cell, but can be any secondary storage device as known in the art, such as magnetic media, EEPROM, optical media, tape, soft or hard disk, or the like.

Accordingly, an embodiment of the invention can include a UE (e.g., UE 300A, 300B, etc.) including the ability to perform the functions described herein. As will be appreciated by those skilled in the art, the various logic elements can be embodied in discrete elements, software modules executed on a processor or any combination of software and hardware to achieve the functionality disclosed herein. For example, ASIC 308, memory 312, API 310 and local database 314 may all be used cooperatively to load, store and execute the various functions disclosed herein and thus the logic to perform these functions may be distributed over various elements. Alternatively, the functionality could be incorporated into one discrete component. Therefore, the features of the UEs 300A and 300B in FIG. 3 are to be considered merely illustrative and the invention is not limited to the illustrated features or arrangement.

The wireless communication between the UEs 300A and/or 300B and the RAN 120 can be based on different technologies, such as CDMA, W-CDMA, time division multiple access (TDMA), frequency division multiple access (FDMA), Orthogonal Frequency Division Multiplexing (OFDM), GSM, or other protocols that may be used in a wireless communications network or a data communications network. As discussed in the foregoing and known in the art, voice transmission and/or data can be transmitted to the UEs from the RAN using a variety of networks and configurations. Accordingly, the illustrations provided herein are not intended to limit the embodiments of the invention and are merely to aid in the description of aspects of embodiments of the invention.

Figure 4:
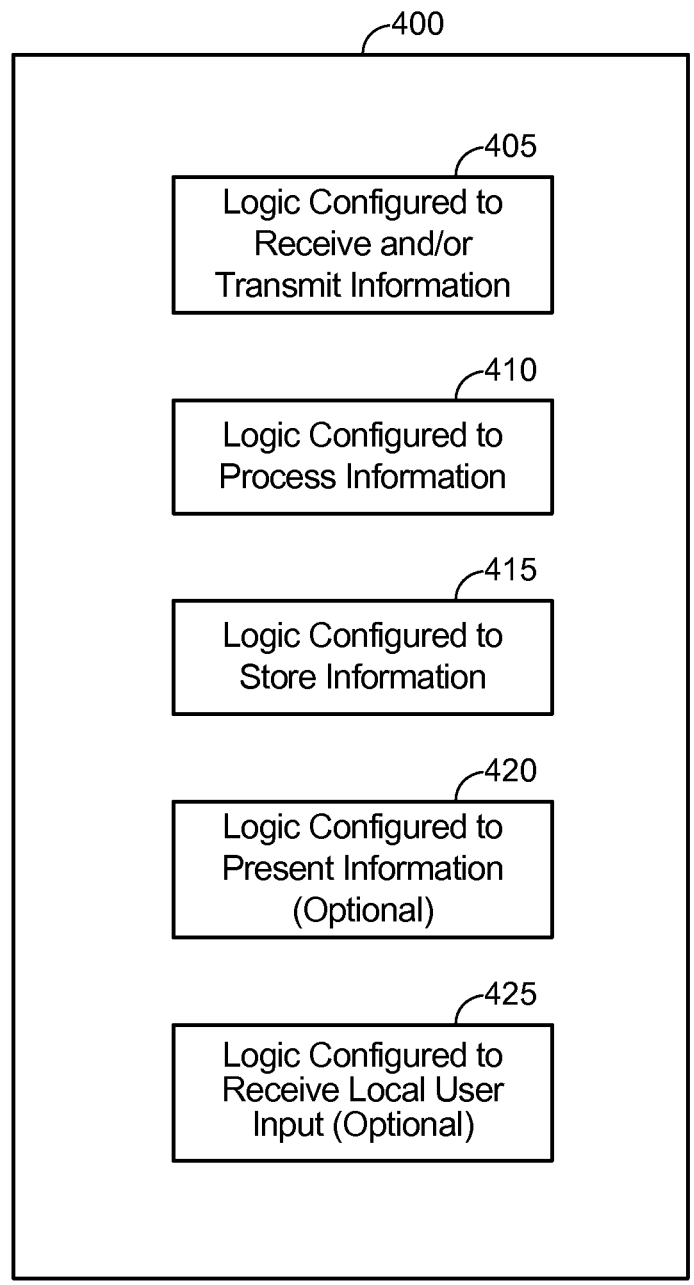
FIG. 4 illustrates a communication device that includes logic configured to perform functionality in accordance with an aspect of the disclosure.

FIG. 4 illustrates a communication device 400 that includes logic configured to perform functionality. The communication device 400 can correspond to any of the above-noted communication devices, including but not limited to UEs 300A or 300B, any component of the RAN 120 (e.g., eNodeBs 200 through 210, etc.), any component of the core network 140 (e.g., MME 215 or 220, HSS 225, S-GW 230, P-GW 235, PCRF 240), any components coupled with the core network 140 and/or the Internet 175 (e.g., the application server 170), and so on. Thus, communication device 400 can correspond to any electronic device that is configured to communicate with (or facilitate communication with) one or more other entities over the wireless communications system 100 of FIG. 1.

Referring to FIG. 4, the communication device 400 includes logic configured to receive and/or transmit information 405. In an example, if the communication device 400 corresponds to a wireless communications device (e.g., UE 300A or 300B, one of eNodeBs 200 through 210, etc.), the logic configured to receive and/or transmit information 405 can include a wireless communications interface (e.g., Bluetooth, Wi-Fi, 2G, CDMA, W-CDMA, 3G, 4G, LTE, etc.) such as a wireless transceiver and associated hardware (e.g., an RF antenna, a MODEM, a modulator and/or demodulator, etc.). In another example, the logic configured to receive and/or transmit information 405 can correspond to a wired communications interface (e.g., a serial connection, a USB or Firewire connection, an Ethernet connection through which the Internet 175 can be accessed, etc.). Thus, if the communication device 400 corresponds to some type of network-based server (e.g., PDSN, SGSN, GGSN, S-GW, P-GW, MME, HSS, PCRF, the application 170, etc.), the logic configured to receive and/or transmit information 405 can correspond to an Ethernet card, in an example, that connects the network-based server to other communication entities via an Ethernet protocol. In a further example, the logic configured to receive and/or transmit information 405 can include sensory or measurement hardware by which the communication device 400 can monitor its local environment (e.g., an accelerometer, a temperature sensor, a light sensor, an antenna for monitoring local RF signals, etc.). The logic configured to receive and/or transmit information 405 can also include software that, when executed, permits the associated hardware of the logic configured to receive and/or transmit information 405 to perform its reception and/or transmission function(s). However, the logic configured to receive and/or transmit information 405 does not correspond to software alone, and the logic configured to receive and/or transmit information 405 relies at least in part upon hardware to achieve its functionality.

Referring to FIG. 4, the communication device 400 further includes logic configured to process information 410. In an example, the logic configured to process information 410 can include at least a processor. Example implementations of the type of processing that can be performed by the logic configured to process information 410 includes but is not limited to performing determinations, establishing connections, making selections between different information options, performing evaluations related to data, interacting with sensors coupled to the communication device 400 to perform measurement operations, converting information from one format to another (e.g., between different protocols such as .wmv to .avi, etc.), and so on. For example, the processor included in the logic configured to process information 410 can correspond to a general purpose processor, a digital signal processor (DSP), an ASIC, a field programmable gate array (FPGA) or other programmable logic device, discrete gate or transistor logic, discrete hardware components, or any combination thereof designed to perform the functions described herein. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration. The logic configured to process information 410 can also include software that, when executed, permits the associated hardware of the logic configured to process information 410 to perform its processing function(s). However, the logic configured to process information 410 does not correspond to software alone, and the logic configured to process information 410 relies at least in part upon hardware to achieve its functionality.

Referring to FIG. 4, the communication device 400 further includes logic configured to store information 415. In an example, the logic configured to store information 415 can include at least a non-transitory memory and associated hardware (e.g., a memory controller, etc.). For example, the non-transitory memory included in the logic configured to store information 415 can correspond to RAM memory, flash memory, ROM memory, EPROM memory, EEPROM memory, registers, hard disk, a removable disk, a CD-ROM, or any other form of storage medium known in the art. The logic configured to store information 415 can also include software that, when executed, permits the associated hardware of the logic configured to store information 415 to perform its storage function(s). However, the logic configured to store information 415 does not correspond to software alone, and the logic configured to store information 415 relies at least in part upon hardware to achieve its functionality.

Referring to FIG. 4, the communication device 400 further optionally includes logic configured to present information 420. In an example, the logic configured to present information 420 can include at least an output device and associated hardware. For example, the output device can include a video output device (e.g., a display screen, a port that can carry video information such as USB, HDMI, etc.), an audio output device (e.g., speakers, a port that can carry audio information such as a microphone jack, USB, HDMI, etc.), a vibration device and/or any other device by which information can be formatted for output or actually outputted by a user or operator of the communication device 400. For example, if the communication device 400 corresponds to UE 300A or UE 300B as shown in FIG. 3, the logic configured to present information 420 can include the display 310A of UE 300A or the touchscreen display 305B of UE 300B. In a further example, the logic configured to present information 420 can be omitted for certain communication devices, such as network communication devices that do not have a local user (e.g., network switches or routers, remote servers, etc.). The logic configured to present information 420 can also include software that, when executed, permits the associated hardware of the logic configured to present information 420 to perform its presentation function(s). However, the logic configured to present information 420 does not correspond to software alone, and the logic configured to present information 420 relies at least in part upon hardware to achieve its functionality.

Referring to FIG. 4, the communication device 400 further optionally includes logic configured to receive local user input 425. In an example, the logic configured to receive local user input 425 can include at least a user input device and associated hardware. For example, the user input device can include buttons, a touchscreen display, a keyboard, a camera, an audio input device (e.g., a microphone or a port that can carry audio information such as a microphone jack, etc.), and/or any other device by which information can be received from a user or operator of the communication device 400. For example, if the communication device 400 corresponds to UE 300A or UE 300B as shown in FIG. 3, the logic configured to receive local user input 425 can include the keypad 320A, any of the buttons 315A or 310B through 325B, the touchscreen display 305B, etc. In a further example, the logic configured to receive local user input 425 can be omitted for certain communication devices, such as network communication devices that do not have a local user (e.g., network switches or routers, remote servers, etc.). The logic configured to receive local user input 425 can also include software that, when executed, permits the associated hardware of the logic configured to receive local user input 425 to perform its input reception function(s). However, the logic configured to receive local user input 425 does not correspond to software alone, and the logic configured to receive local user input 425 relies at least in part upon hardware to achieve its functionality.

Referring to FIG. 4, while the configured logics of 405 through 425 are shown as separate or distinct blocks in FIG. 4, it will be appreciated that the hardware and/or software by which the respective configured logic performs its functionality can overlap in part. For example, any software used to facilitate the functionality of the configured logics of 405 through 425 can be stored in the non-transitory memory associated with the logic configured to store information 415, such that the configured logics of 405 through 425 each performs their functionality (i.e., in this case, software execution) based in part upon the operation of software stored by the logic configured to store information 415. Likewise, hardware that is directly associated with one of the configured logics can be borrowed or used by other configured logics from time to time. For example, the processor of the logic configured to process information 410 can format data into an appropriate format before being transmitted by the logic configured to receive and/or transmit information 405, such that the logic configured to receive and/or transmit information 405 performs its functionality (i.e., in this case, transmission of data) based in part upon the operation of hardware (i.e., the processor) associated with the logic configured to process information 410.

Generally, unless stated otherwise explicitly, the phrase "logic configured to" as used throughout this disclosure is intended to invoke an embodiment that is at least partially implemented with hardware, and is not intended to map to software-only implementations that are independent of hardware. Also, it will be appreciated that the configured logic or "logic configured to" in the various blocks are not limited to specific logic gates or elements, but generally refer to the ability to perform the functionality described herein (either via hardware or a combination of hardware and software). Thus, the configured logics or "logic configured to" as illustrated in the various blocks are not necessarily implemented as logic gates or logic elements despite sharing the word "logic." Other interactions or cooperation between the logic in the various blocks will become clear to one of ordinary skill in the art from a review of the embodiments described below in more detail.

Figure 5:
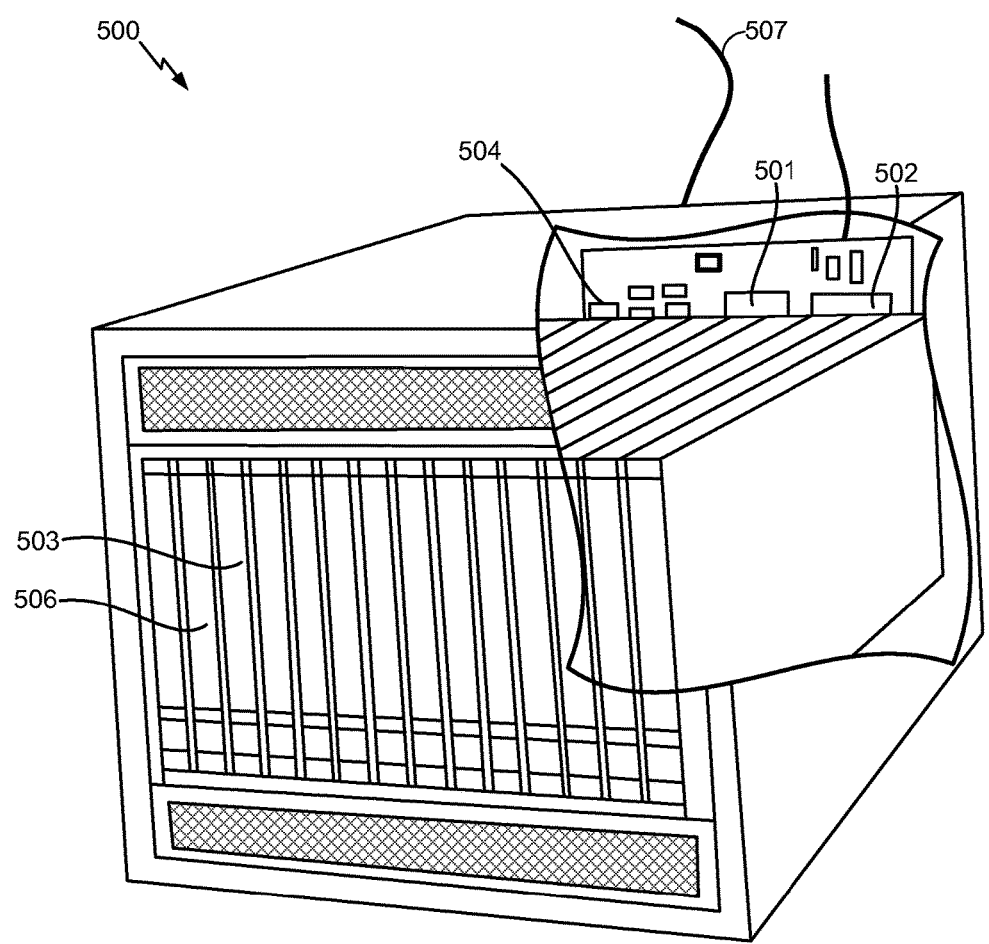
FIG. 5 illustrates a server in accordance with an aspect of the disclosure.

The various embodiments may be implemented on any of a variety of commercially available server devices, such as server 500 illustrated in FIG. 5. In an example, the server 500 may correspond to one example configuration of the application server 170 described above. In FIG. 5, the server 500 includes a processor 501 coupled to volatile memory 502 and a large capacity nonvolatile memory, such as a disk drive 503. The server 500 may also include a floppy disc drive, compact disc (CD) or DVD disc drive 506 coupled to the processor 501. The server 500 may also include network access ports 504 coupled to the processor 501 for establishing data connections with a network 507, such as a local area network coupled to other broadcast system computers and servers or to the Internet. In context with FIG. 4, it will be appreciated that the server 500 of FIG. 5 illustrates one example implementation of the communication device 400, whereby the logic configured to transmit and/or receive information 405 corresponds to the network access ports 504 used by the server 500 to communicate with the network 507, the logic configured to process information 410 corresponds to the processor 501, and the logic configuration to store information 415 corresponds to any combination of the volatile memory 502, the disk drive 503 and/or the disc drive 506. The optional logic configured to present information 420 and the optional logic configured to receive local user input 425 are not shown explicitly in FIG. 5 and may or may not be included therein. Thus, FIG. 5 helps to demonstrate that the communication device 400 may be implemented as a server, in addition to a UE implementation as in 305A or 305B as in FIG. 3.

Figure 6:
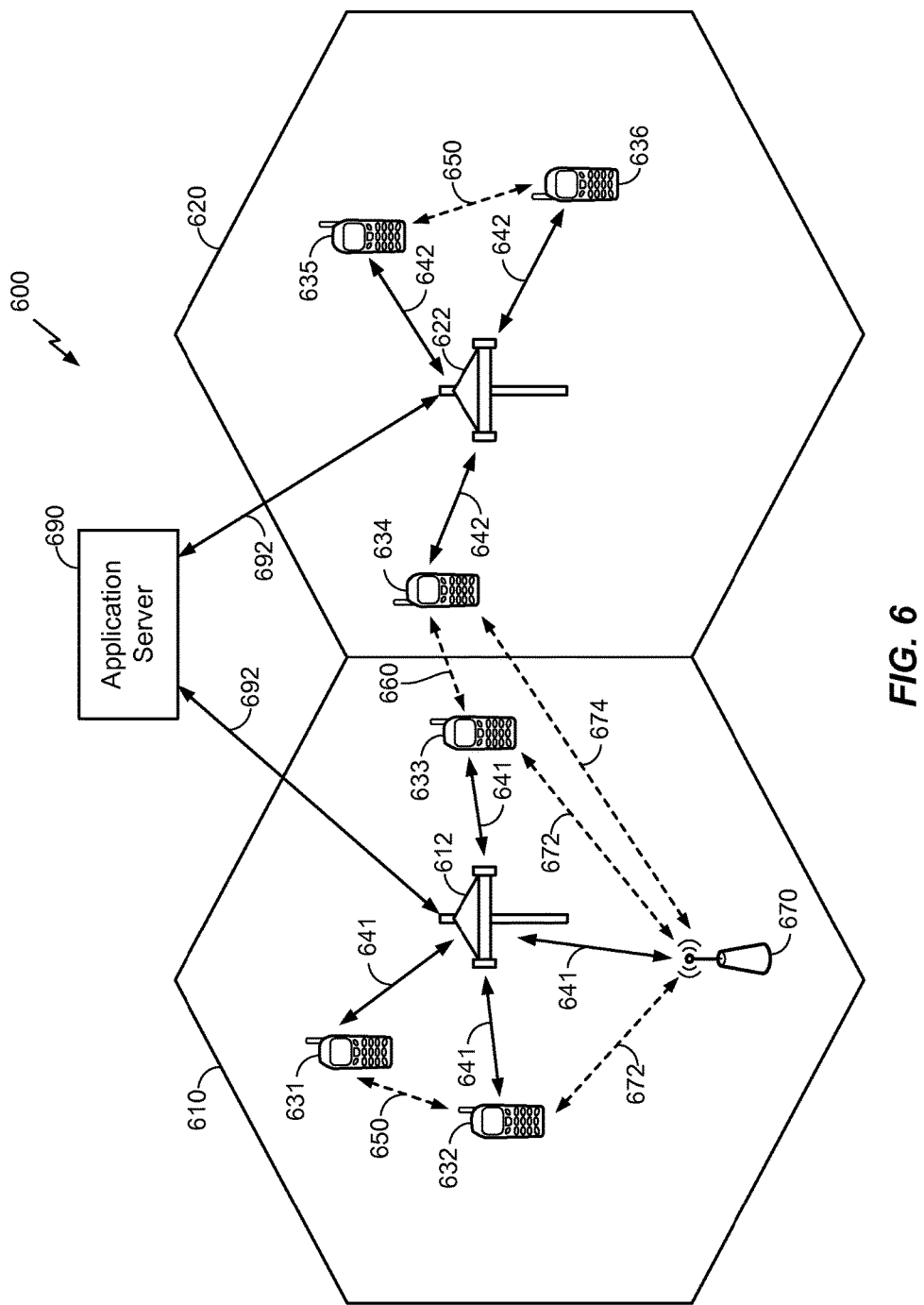
FIG. 6 illustrates a communications environment in which UEs can communicate using peer-to-peer technology.

FIG. 6 illustrates a wireless communications system 600 whereby a device can discover directly and/or connect directly to other devices using P2P technology (e.g., LTE-D, Wi-Fi Direct, Bluetooth, etc.) or connect to a Wireless Wide Area Network, such as, for example, an LTE network. FIG. 6 shows a first cell 610 having a first base station 612, a second cell 620 having a second base station 622, and the application server 690 coupled to the first base station 612 and the second base station 622 via a network link 692 (e.g., the Rx link of FIG. 2, etc.). The radio access area, or coverage area, of a given base station is represented by the cell in which the given base station is located, whereby for purposes of discussion, the first cell 610 includes the coverage area corresponding to the first base station 612 and the second cell 620 includes the coverage area corresponding to the second base station 622. Although not shown in FIG. 6, in some embodiments the base stations 612, 622 may be connected to one another via a backhaul link.

Each of the cells 610, 620 in the wireless communications system 600 include various devices that communicate with the respective base stations 612, 622 and with the application server 690 via the respective base stations 612, 622. For example, in the embodiment illustrated in FIG. 6, the first cell 610 includes UE 631, UE 632, and UE 633, while the second cell 620 includes UE 634, UE 635, and UE 636, wherein one or more of the UEs in the wireless communications system 600 may be mobile or other wireless devices. The UEs 631-636 may each correspond to one or more of UE 300A, UE 300B, and/or communication device 400, as shown in FIGS. 3-4.

FIG. 6 also depicts an announcement device 670 located in first cell 610 Like UEs 631-636, announcement device 670 may correspond to one or more of UE 300A, UE 300B, and/or communication device 400, as shown in FIGS. 3-4. In accordance with an aspect of the disclosure, UEs 631-636 and announcement device 670 support communications through the network infrastructure elements such as the first base station 612 and/or the second base station 622. In communications that involve network infrastructure, signals may generally be transmitted and received through uplink and downlink connections between various UEs and the base stations 612, 622, such as link 641 in the first cell 610 and link 642 in the second cell 620. Each of the base stations 612, 622 generally serve as the attachment point for the UEs in the corresponding cells 610, 620 and facilitate communications between the UEs served therein. As depicted in FIG. 6, each of UEs 631-633 and announcement device 670 communicate with the first base station 612 via the link 641. Moreover, UEs 634-636 communicate with the second base station 622 via the link 642. Device 280, as depicted in FIG. 6, does not communicate via the link 641 or the link 642.

One or more of the UEs 631-636 and announcement device 670 may also support direct P2P communications, whereby they support communicating with one another directly without having to communicate through another device or a network infrastructure element such as the first base station 612 and the second base station 622. When two or more UEs, such as UE 631 and UE 632, wish to communicate with one another and are located in sufficient proximity to each other, then a direct P2P link 650 can be established there between, which may offload traffic from the base station 612 serving the UEs 631, 632, allow UEs 631, 632 to communicate more efficiently, or provide other advantages that will be apparent to those skilled in the art. Another direct P2P link 650 is shown between UE 635 and UE 636. Moreover, for inter-cell communications where the participating UEs are in different cells, a direct P2P communications link is still a possibility, which is illustrated in FIG. 6 where UE 633 and UE 634 may communicate using direct P2P link 660.

Announcement device 670 may have similar capabilities as UEs 631-636. For example, announcement device 670 may communicate with the first base station 612 through link 641, as depicted in FIG. 6. Moreover, announcement device 670 may also support direct P2P communications. For example, announcement device 670 may communicate with UE 632 and 633 (with which it shares a cell) through a direct P2P link 672, or with UE 634 (with which it does not share a cell) through a direct P2P link 674.

In one possible scenario, direct P2P links 650, 660, 672, and 674 are D2D links utilizing LTE-D technology. LTE-D corresponds to a proposed 3GPP Release 12 D2D solution for proximate discovery. LTE-D dispenses with location tracking and network calls by directly monitoring for services on other LTE-D devices within a large range (~500 m, line of sight). It does so continuously in a synchronous system that is battery efficient, and can concurrently detect thousands of services in proximity. LTE-D has a wider range than other D2D P2P technologies, such as Wi-Fi Direct (WFD) or Bluetooth, which can themselves be the technologies used for direct P2P links.

LTE-D operates on licensed spectrum as a service to mobile applications. LTE-D is a device-to-device (D2D) solution that enables service layer discovery and also D2D communication. Mobile applications on LTE-D devices can instruct LTE-D to monitor for mobile application services on other devices and announce their own services (for detection by services on other LTE-D devices) at the physical layer, which allows the applications to close while LTE-D does the work—continuously—and notifies the client application when a match to a "monitor" established by an associated application is detected. For example, the application can establish a monitor for "tennis events" and the LTE-D discovery layer can wake-up the application when a tennis-related LTE-D discovery message is detected.

LTE-D is thus an attractive alternative to mobile developers seeking to deploy proximate discovery solutions as extensions of their existing cloud services. LTE-D is a distributed discovery solution (versus the centralized discovery that exists today), whereby mobile applications forego centralized database processing in identifying relevancy matches, instead autonomously determining relevance at the device level by transmitting and monitoring for relevant attributes. LTE-D offers certain benefits in terms of privacy as well as power consumption, in that LTE-D does not utilize perpetual location tracking to determine proximity. By keeping discovery on the device rather than in the cloud, the user has more control of what information is shared with external devices.

LTE-D relies upon "expressions" for both discovery of proximate peers and facilitating communication between proximate peers. Expressions at the application layer and/or the service layer are referred to as "expression names" (e.g., ShirtSale@Gap.com, Jane@Facebook.com, etc.), wherein expression names at the application layer and/or the service layer are mapped to bit-strings at the physical layer that are referred to as "expression codes". In an example, each expression code can have a length of 192 bits. As will be appreciated, any reference to a particular expression can refer to the expression's associated expression name, expression code, or both, depending on context, and furthermore, expressions can be either "private" or "public" based on the mapping type. Public expressions are made public and can be identified by any application, whereby private expressions are targeted for specific audiences. In 3GPP, different terminology may be used. For example, an "expression name" may be referred to as a "ProSe Application ID", and an "expression code" may be referred to as a "ProSe Application Code". A "public" expression in LTE-D may be subject to "open discovery" using 3GPP terminology, and "private" expression corresponds to "restricted discovery".

Discovery in LTE-D operates in a synchronous manner based on parameters that are configured by the LTE network itself. For example, frequency division duplexing (FDD) and/or time division duplexing (TDD) may be assigned by a serving eNode B via a Session Information Block (SIB). The serving eNode B can also configure an interval at which LTE-D devices are to announce themselves (e.g., every 20 seconds, etc.) via transmission of a Service Discovery (or P2P Discovery) message. For example, for a 10 MHz FDD system, the eNode B can allocate 44 Physical Uplink Shared Channel (PUSCH) radio bearers (RBs) to be used for discovery in accordance with a discovery period that occurs every 20 seconds and includes 64 sub-frames, such that the number of direct discovery resources (DRIDs) is 44×64=2816.

Figure 7:
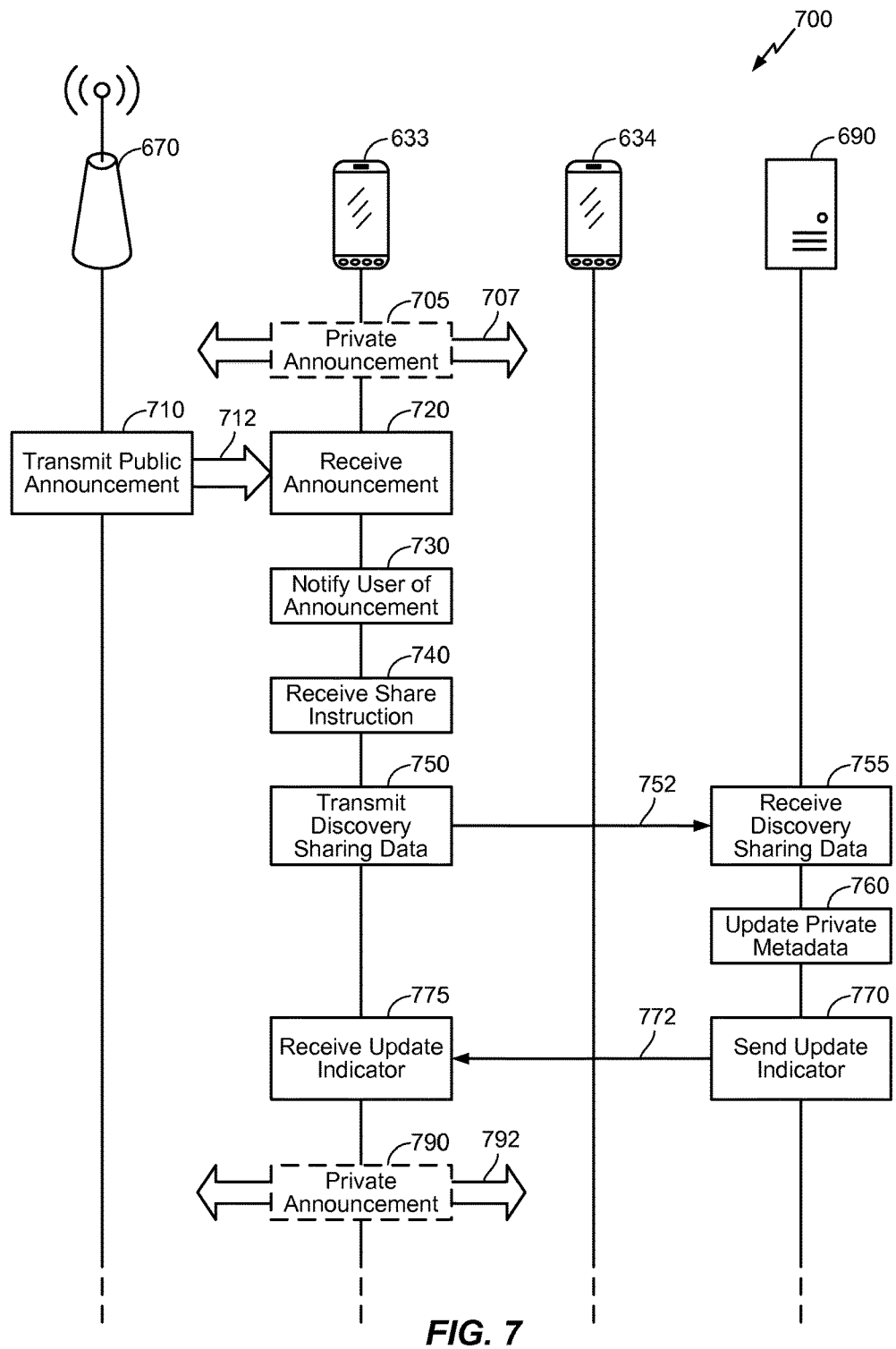
FIG. 7 illustrates a signal flow diagram for sharing a received announcement from an announcement device.

FIG. 7 generally illustrates a signaling flow diagram 700 in which a device (for example, UE 633) discovers a public announcement and shares the discovery of the public announcement. FIG. 7 shows the announcement device 670, UE 633, and application server 690 depicted in FIG. 6. It will be understood, however, that announcement device 670, and UE 633 may each correspond to one or more of UE 300A, UE 300B, and/or communication device 400, as depicted in FIGS. 3-4. Moreover, application server 690 may correspond to server 500, as depicted in FIG. 5.

At 705, the UE 633 transmits a private announcement 707. The private announcement 707 may be used to identify the UE 633 to other UEs (not shown) in proximity to the UE 633. In general, it will be understood that a "proximate" UE is any UE that is near enough to receive the private announcement 707 at a given moment. The term "proximity" may have specific meaning in the context of a particular P2P technology. Other proximate UEs may require explicit permission from the UE 633 in order to discover the UE 633. Because explicit permission is required, the private announcement 707 may be referred to a restricted discovery message/announcement, in contrast to an open discovery message/announcement, which requires no explicit permission. For example, the Bluetooth Low Energy (BTLE) Protocol uses a discovery frame, which is described in greater detail in FIG. 14. Another suitable protocol is the Wi-Fi Alliance Neighbor-Aware Networking (NAN) protocol, in which the announcement device 670 transmits a service discovery frame, which is described in greater detail in FIG. 13.

Figure 10:
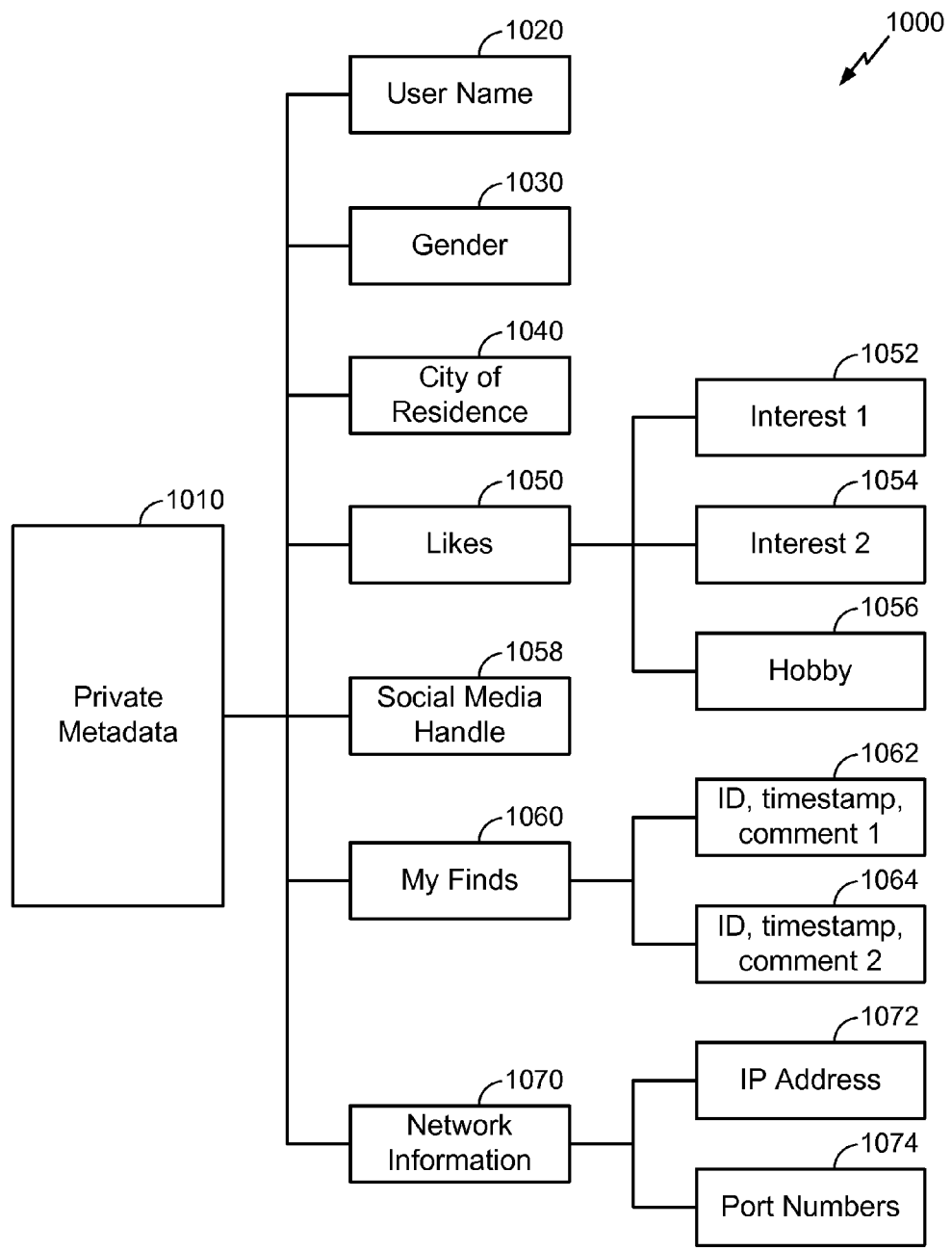
FIG. 10 illustrates an example of a data structure for private metadata.

In some implementations, the transmission at 705 of the private announcement 707 is performed periodically in accordance with the LTE-D operations described above. For example, if there is another proximate UE in the area which has permission to discover the UE 633, then the private announcement 707 may serve to notify the other proximate UE of the presence of UE 633. The private announcement 707 may include identification data that uniquely identifies UE 633, or a user of an application running on the UE 633. The proximate UE which discovers UE 633 may then be able to retrieve private metadata associated with the expression code being announced by UE 633. The private metadata may be stored on a server, for example, application server 690. FIG. 10 shows an example of a private metadata structure 1000, which will be described in detail elsewhere in the disclosure. Although, in the signaling flow diagram 700, the private announcement 707 is transmitted only once, and is not received by any other UE, it will be understood that the transmission 705 is depicted solely for illustrative purposes. The transmission 705 may be performed multiple times, or not at all, and may be received or not received by any number of proximate UEs.

At 710, the announcement device 670 transmits a public announcement 712. Any proximate UE may discover the public announcement 712. No explicit permission is required from the announcement device 670 to discover the announcement device 670. Because no explicit permission is required, the public announcement 712 may be referred to as open announcement, in contrast to a restricted announcement. The public announcement 712 may be generated in accordance with 3GPP ProSe discovery protocol, LTE-D discovery protocol, or any other suitable protocol. For example, the Bluetooth Low Energy (BTLE) Protocol uses a discovery frame, which is described in greater detail in FIG. 14. Another suitable protocol is the Wi-Fi Alliance Neighbor-Aware Networking (NAN) protocol, in which the announcement device 670 transmits a service discovery frame, which is described in greater detail in FIG. 13.

Figure 11:
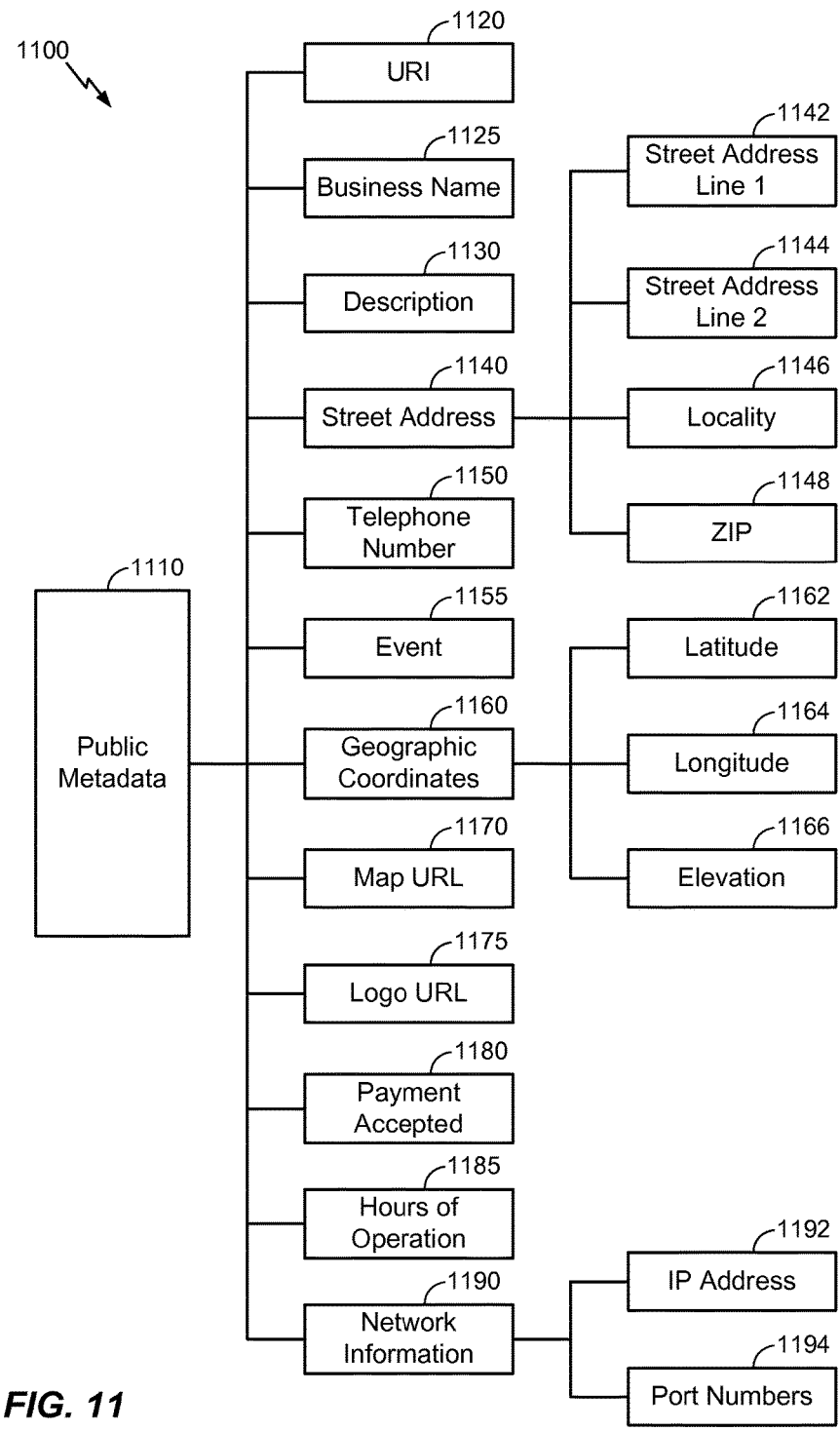
FIG. 11 illustrates an example of a data structure for public metadata.

In some implementations, the transmission at 710 of the public announcement 712 is performed periodically. For example, if there is a proximate UE in the area, then the public announcement 712 may serve to notify the other proximate UE of the presence of the announcement device 670. The public announcement 712 may include identification data that uniquely identifies the announcement device 670 or an application running on the announcement device 670. A proximate UE which discovers the announcement device 670 may then be able to retrieve public metadata associated with, for example, the expression code announced by the announcement device 670. The public metadata may be stored on a server, for example, application server 690, or, as it may be referred to in 3GPP, a "ProSe Function". FIG. 11 shows an example of a public metadata structure 1100, which will be described in detail elsewhere in the disclosure.

At 720, a UE 633 which is proximate to the announcement device 670 receives the public announcement 712. At 730, the UE 633 notifies the user of UE 633 of the received announcement.

The receiving of the public announcement at 720 and the notification at 730 may be performed as part of a publish/subscribe or announce/monitor scheme. In some implementations, an application installed on the UE 633 may retrieve monitoring information from an application service provider (for example, a remote server similar to server 500). The monitoring information may be formatted as a public expression string, and may identify the announcements or categories of announcement that the application monitors. The application will send the public expression string to a discovery service installed on the UE 633, for example, a modem or the like. The UE 633 will send the public expression string to, for example, the ProSe function. The ProSe function will convert the public expression string to a monitoring filter which is transmitted back to the UE 633. Once received by the UE 633, the monitoring filter can be used to determine whether a received announcement matches the announcement or categories of announcement that the application monitors. If there is a match, then the UE 633 can retrieve metadata (for example, having the public metadata structure 1100 of FIG. 11) relating to the announcement from local storage. If the metadata is not available in local storage, then the UE 633 can retrieve the metadata from the ProSe function. In order to retrieve the metadata from the ProSe function, the UE 633 will transmit a discovered ProSe Application Code to the ProSe function. In 3GPP, this transmission may be referred to as a Match Report message. The ProSe function will then look up the ProSe Application Code to retrieve the associated ProSe Application ID (referred to as an expression name in LTE-D) and the metadata associated with the ProSe Application Code. The metadata can be sent back to the UE 633 and used at the application level to generate a user-readable notification.

To illustrate, if the user of UE 633 has an interest in shoes, or shoe shopping, then an application installed on the UE 633 may generate monitoring information based on that interest. A ProSe server can then provide a monitoring filter that enables the UE 633 to identify received public announcements that relate to shoes. If the announcement device 670 is associated with a retail establishment that sells shoes, then the UE 633 may notify the application that a public announcement 712 relating to shoes has been received. The application can then notify the user of UE 633 in any suitable manner. The notification may include data derived from the shoe retailer's metadata. FIG. 11 shows an example of a public metadata structure 1100, which will be described in detail elsewhere in the disclosure. The shoe retailer's metadata may include similar information.

The notification of 730 may be of any suitable form. According to one example, the public announcement 712 and/or the additional announcement-related data is converted to a format that is readable by an application stored on the UE 633. The application may then facilitate the notification of the user at 730. The notification may be performed using any component of the UE 633, for example, components analogous to display 310A of UE 300A, touchscreen display 305B of UE 300B, etc.

At 740, the UE 633 receives a share instruction. The share instruction may be received using any component of the UE 633, for example, components analogous to keypad 320A of UE 300A, touchscreen display 305B of UE 300B, etc. In some implementations, the share instruction may include additional sharing-related data, for example, contextual data that is entered by the user or attached by the user. The contextual data may include text data, audio data, video data, etc. To return to the previous illustration, the user may receive at 730 a notification that a shoe sale is in progress at a nearby retailer. The user may instruct at 740 the UE 633 to share the news that a particular nearby retailer is having a shoe sale. The share instruction may include additional sharing-related data, for example, a personal comment (e.g., text data such as "check this out" or "you can't miss this!").

At 750, the UE 633 transmits discovery sharing data 752 to the application server 690. At 755, the application server 690 receives the discovery sharing data 752. The discovery sharing data 752 includes a notification that the user of UE 633 wishes to share his or her discovery of the public announcement 712. To return to the previous illustration, the user 633 may wish to express enthusiasm about the shoe sale, and the discovery sharing data 752 may relate to that enthusiasm.

The discovery sharing data 752 may include, for example, data that identifies the announcement device, the ProSe Application Name announced by the announcement device 670, or the public announcement 712. In LTE-D, for example, the discovery sharing data 752 may include data that is referred to as an expression name. Additionally or alternatively, the discovery sharing data 752 may include a notification that the UE 633 has received (at 720) the public announcement 712, a notification that the UE 633 has notified the user of UE 633 (at 730) of the public announcement 712, and/or a notification that the UE 633 has received a share instruction from the user (at 740). Additionally or alternatively, the discovery sharing data 752 may include the additional sharing-related data described above (for example, the textual comment such as "check this out" or "you can't miss this!"). Additionally or alternatively, the discovery sharing data 752 may include application data relating to any of the operations described at 720, 730, and 740.

At 760, the application server 690 updates the private metadata associated with the UE 633. The application server 690 may be the ProSe server referred to in a previous illustration (the same server that stores the public metadata associated with the shoe retailer), or a different server. FIG. 10 shows an example of a private metadata structure 1000, which will be described in detail elsewhere in the disclosure. The private metadata associated with the UE 633 may be updated on the basis of any of the data included in the discovery sharing data 752 received at 755. The update to the private metadata associated with the UE 633 may, for example, identify the announcement device 670 or the public announcement 712 (for example, a ProSe Application Code associated with the announcement device 670 or the public announcement 712). Additionally or alternatively, the update may include data indicating that the UE 633 has received the public announcement 712 (at 720), that the UE 633 has notified the user (at 730), and/or a notification that the UE 633 has received a share instruction from the user (at 740). Additionally or alternatively, the update may include the additional sharing-related data described above (for example, the textual comment such as "check this out" or "you can't miss this!").

At 770, the application server 690 sends an update indicator 772 to the UE 633. At 775, the UE 633 receives the update indicator 772. In some implementations, the update indicator 772 is simply an acknowledgement that the update 752 has been received. The UE 633 may then generate a new private announcement code based on the knowledge that the update 752 has been received by the application server 690. But in other implementations, the update indicator 772 includes, for example, a new private announcement code assigned by the application server 690 to be used by the UE 633 in future private announcements. In this scenario, the UE 633 generates a new private announcement code by, in effect, obtaining it from the application server 690.

In some implementations, the new private announcement code received at 775 includes the update status of the private metadata associated with the UE 633. To illustrate, the update status of the private metadata associated with the UE 633 may be a timestamp indicating the timing of the last update to the private metadata, a version number indicating how many times the private metadata has been updated (modulo some maximum if the version number can roll over), or an update identification number that uniquely identifies the most recent update. Additionally or alternatively, the update status of the private metadata associated with the private announcement code may comprise a new find flag (for example, a flag code or flag bit) that indicates that the UE 633 has discovered an interesting public or private announcement. In some implementations, the new find flag is set to expire or reset. The new find flag may expire or reset, for example, after an arbitrary predetermined interval, or upon an interval associated with the announcement device 670 or the public announcement 712. The new find flag may also be removed by the UE 633 (e.g., upon user input) from the announcement code that is broadcast periodically. In some implementations, the update indicator 772 does not include a new private announcement code in its entirety, and instead simply provides instructions for updating a timestamp, version number, update identification number, or new find flag.

Figure 12:
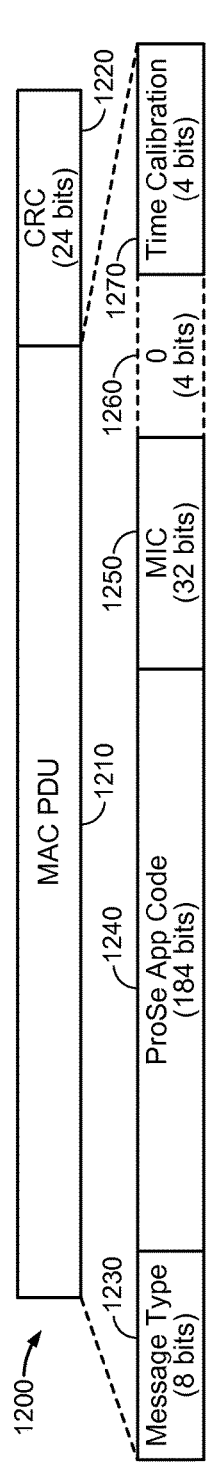
FIG. 12 illustrates an example of a discovery frame in LTE-D.
Figure 13:
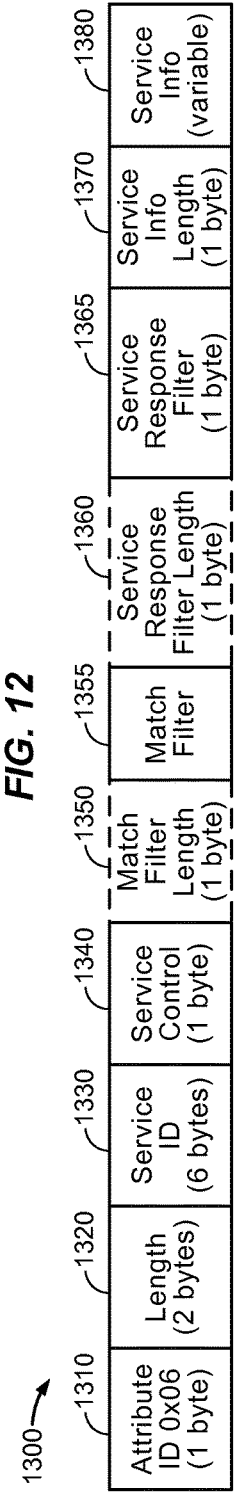
FIG. 13 illustrates an example of a discovery frame in Wi-Fi Direct.
Figure 14:
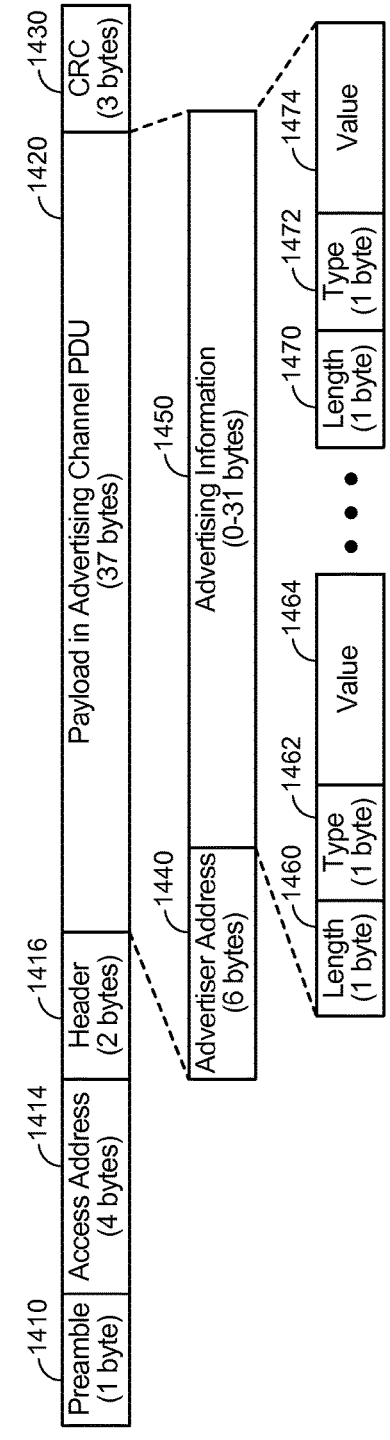
FIG. 14 illustrates an example of a discovery frame in Bluetooth Low Energy (BTLE).

At 790, the UE 633 transmits a private announcement 792. The private announcement 792 may be similar to the private announcement 707 described above. However, the private announcement code associated with the private announcement 792 is a private announcement code which has been generated at 775 in accordance with the received update indicator 772, i.e., to reflect that the user of the UE 633 is sharing an announcement. As a result, a proximate UE which receives the private announcement 707 transmitted at 705 and the private announcement 792 (transmitted at 790) will be able to distinguish them from one another. For example, if the second private announcement 792 includes a version number that is different from a version number included in the first private announcement 707, then the proximate UE which receives the second private announcement 792 will be able to determine from the new version number that the status of the private metadata associated with the UE 633 has changed. This status change may indicate that new or updated private metadata associated with the UE 633 is available. FIG. 12, FIG. 13, and FIG. 14 show examples of discovery frames associated with LTE-D/ProSe, Wi-Fi Direct, and BTLE, respectively. The private announcement 792 may take the form of any of the discovery frames depicted in FIG. 12, FIG. 13, or FIG. 14.

As noted above, the new or updated private metadata associated with the UE 633 (stored on the application server 690) may indicate that UE 633 has, for example, discovered the public announcement 712, shared that discovery, and/or provided additional sharing-related data on that discovery. A proximate UE can be notified of the shared discovery in the manner described below, as depicted in FIG. 8 and FIG. 9.

Figure 8:
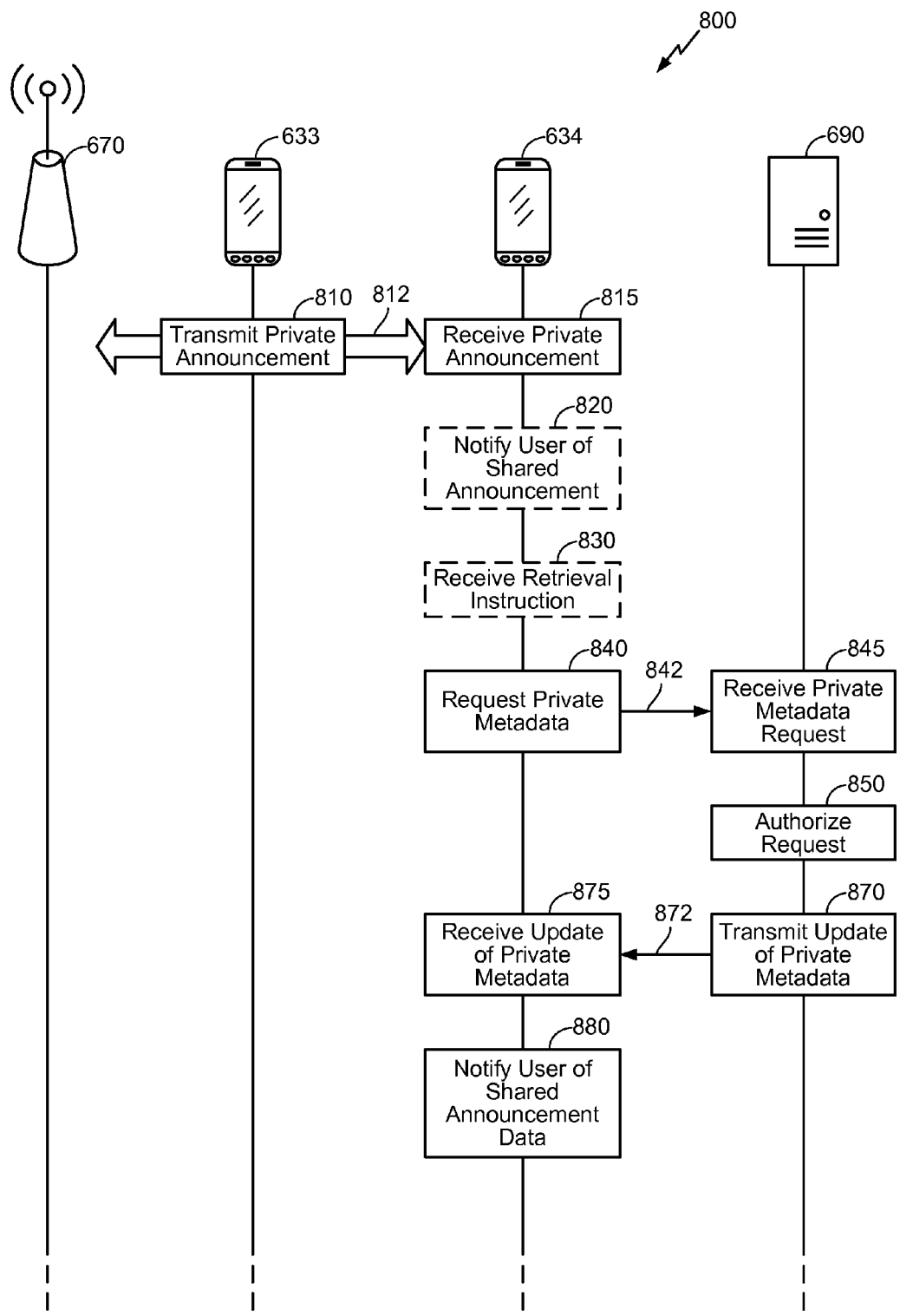
FIG. 8 illustrates a signal flow diagram for retrieving updated metadata associated with a sharing mobile device.
Figure 9:
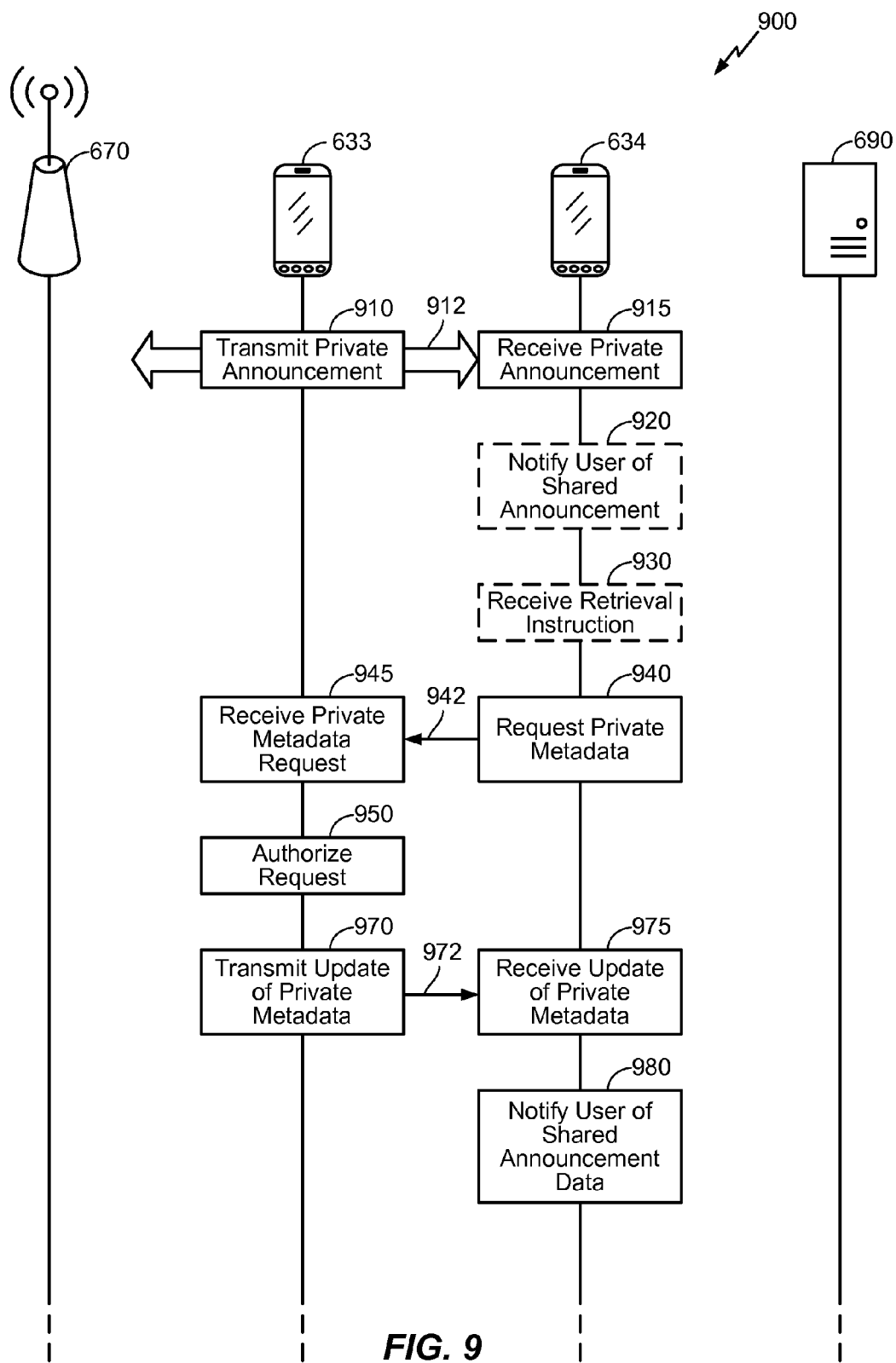
FIG. 9 illustrates another signal flow diagram for retrieving updated metadata associated with a sharing mobile device.

FIG. 8 generally illustrates a signaling flow diagram 800 for sharing a discovery of a public announcement in accordance with an aspect of the disclosure. FIG. 8 shows the announcement device 670, UE 633, UE 634, and application server 690 depicted in FIG. 6.

At 810, an announcing UE (for example, UE 633 as depicted in FIG. 8) transmits a private announcement 812. The private announcement 812 may be analogous to the private announcement 792 described in relation to FIG. 7. In other words, it may include an updated private announcement code that identifies the UE 633 and/or the status of the private metadata associated with the UE 633. To illustrate, the private announcement 812 may include a new find flag that is activated, thereby indicating that the user of UE 633 has shared his or her discovery of one or more interesting public announcements.

At 815, a monitoring UE (for example, UE 634 as depicted in FIG. 8) receives the private announcement 812 transmitted by the UE 633 (at 810). Based on some characteristic of the private announcement 812, the UE 634 determines that UE 633 has updated its private metadata. To return to the previous illustration, the UE 634 may recognize, for example, that the private announcement 812 includes a new find flag which has been activated.

The receiving of the private announcement at 815 and the notification at 820 may be performed as part of a publish/subscribe or announce/monitor scheme, similar to the scheme described above with respect to the receiving of the public announcement at 720 and the notification at 730. An application installed on the UE 634 may monitor to private announcements (such as private announcement 812) based on the identity of the announcing entity. In some implementations, an application installed on the UE 634 may retrieve monitoring information from an application service provider (for example, a remote server similar to server 500). The monitoring information may be formatted as a private expression string, and may identify a particular user or UE (for example, UE 633) from which the UE 634 is authorized/enabled to and/or would like to receive private announcements. Private announcements may be associated with privileges, whereby private announcements can only be understood by receiving UEs that have sufficient privileges to do so. The application will send the private expression string to a discovery service installed on the UE 634, for example, a modem or the like. The UE 634 will send the private expression string to a proximity service server (for example, the "ProSe" server described above). The ProSe server will convert the private expression string to a monitoring filter which is transmitted back to the UE 634, assuming that the UE 634 has the proper privileges. Once received by the UE 634, the monitoring filter can be used to determine whether the UE 634 is permitted to discover the private announcement 812 transmitted by UE 633. In a scenario in which the UE 634 is monitoring for a private announcement, the monitoring filter may simply include the ProSe Application Code (or in LTE-D, the expression code) of the entity associated with the private announcement.

To illustrate, if the user of UE 634 is a sister of the user of UE 633, then each UE may have sufficient privileges to receive and make sense of the private announcements transmitted by the other. In other words, UE 633 and UE 634 are discoverable to one another. If the UE 634 receives a private announcement 812 from the UE 633, then this indicates that the sisters are proximate to one another.

Moreover, if the private announcement 812 includes an activated new find flag (as described in the previous illustration), then the user of 634 may be made aware that her sister (the user of UE 633) wishes to share her discovery of a public announcement.

The notification at 820 may be of any suitable form. According to one example, the private announcement 812 is converted to a format that is readable by an application stored on the UE 634. The application may then facilitate the notification of the user of UE 634 at 820. The notification may be performed using any component of the UE 634, for example, components analogous to display 310A of UE 300A, touchscreen display 305B of UE 300B, etc. To return to the previous illustration, the notification at 820 may include data derived from the private metadata of the user 633, which may be stored locally on UE 634. The notification at 820 may also indicate that the new find flag has been activated. For example, the notification at 820 may be a textual notification stating that "Sister is nearby, and has discovered something interesting . . . ." The notification at 820 may include additional information (as will be illustrated in FIG. 12), but it will be understood that the amount of data in the private announcement 812 is subject to size constraints. The new find flag may comprise a single bit which is either activated or not activated, thereby minimizing the new find flag's impact relative to the Code size constraints.

At 830, the UE 634 receives a retrieval instruction. The retrieval instruction may be received using any component of the UE 633, for example, components analogous to keypad 320A of UE 300A, touchscreen display 305B of UE 300B, etc. In some implementations, the UE 634 is configured to prompt the user of 634 to initiate retrieval of data related to the private announcement 812. The prompt may be included in the notification at 820. The UE 634 proceeds to request private metadata (at 840, as described below) after the user of UE 634 accepts the prompt.

To return to the previous illustration, the user of UE 634 is notified at 820 that the user of UE 633, her sister, wishes to share her discovery of a public announcement ("Sister is nearby, and has discovered something interesting . . . "). The user of UE 634 may conclude that she would also like to discover this public announcement, based on, for example, the fact the she shares many of the same interests as her sister. In some implementations, the notification at 820 may include a user prompt that the user of UE 634 can interact with in order to obtain further information. For example, if the notification at 820 appears on a touchscreen display of UE 634, the user of UE 634 can press the notification. As a result, the user of UE 634 is determined to have accepted the prompt, and UE 634 proceeds to 840.

It will be understood that in some implementations, the notification at 820 and the retrieval instruction reception at 830 may be omitted. For example, the UE 634 may be configured to automatically request private metadata (at 840, see below) in response to receipt of the private announcement 812 (at 815). To illustrate, the user of UE 634 may command the UE 634 to request the private metadata (at 840) without notifying the user of UE 634 or prompting the user of UE 634 to request private metadata. In some implementations, the user of UE 634 may select particular other UEs (for example, associated with 'favorite' friends, family, opinion leaders, etc.) for which request of private metadata at 840 is automatic.

At 840, the UE 634 requests private metadata from the application server 690. As noted above, based on some characteristic of the private announcement 812, the UE 634 has determined that UE 633 has updated private metadata. To return to a previous illustration, the UE 634 may recognize, for example, that the private announcement 812 includes a new find flag which has been activated. In order to obtain the new updated private metadata, the UE 634 transmits a private metadata request 842 to the application server 690. At 845, the application server 690 receives the private metadata request 842.

The private metadata request 842 may include any data relevant to obtaining private metadata. For example, the private metadata request 842 may include the private announcement itself, the name of the application that found this match, and/or an identification of the UE 634 (which is transmitting the request). Additionally or alternatively, the private metadata request 842 may include only one or several specific fields of the metadata (e.g., only the "My Finds" component, as illustrated in FIG. 10).

At 850, the application server 690 authorizes the request. For example, the user of UE 633 may have determined to prevent a particular requesting party from obtaining his or her private metadata. In another example, the application server 690 may be configured, by default, to prevent all requesting parties from obtaining the private metadata associated with the user of UE 633, unless the user of UE 633 has given authorization. It will be understood that authorization may be verified in any suitable manner. In some implementations, for example, the application server 690 contacts the UE 633 to obtain explicit authorization at 850. In other implementations, the application server 690 has a record of requesting parties that are authorized to access the private metadata associate with the UE 633. Once authorization has been completed, the server proceeds to 870.

At 870, the application server 690 transmits a private metadata update 872. The private metadata update 872 is sent to the UE 634 in response to the private metadata request at 840. At 875, the UE 634 receives the private metadata update 872 transmitted from the application server 690. This metadata update 872 may contain other parameters such as the Private application ID (expression name), validity time of the corresponding Code, timestamp of the time when the metadata was updated with the new find. As noted above, FIG. 10 shows an example of a private metadata structure 1000 in accordance with an aspect of the disclosure. In one implementation, the private metadata update 872 includes all of the data included in the private metadata 1010.

In another implementation, the private metadata update 872 includes portions of the private metadata 1010, for example, portions that have been updated. To return to a previous illustration, the private metadata 1010 associated with the user of UE 633 may include, for example, a my finds data block 1060 that includes data relating to public announcements discovered by the user of UE 633 that the user of UE 633 has decided to share. In this illustration, the my finds data block 1060 includes a first shared my finds data block 1062 and a second shared my finds data block 1064. In this illustration, the first shared my finds data block 1062 may include, for example, an identification of the received public announcement 712 depicted in FIG. 7. The first shared my finds data block 1062 may further include a timestamp relating to, for example, the time the public announcement 712 was received (at 720), the time that the user of UE 633 decided to share the public announcement 712 (at 740), the time that the public announcement 712 expires, etc. The first shared my finds data block 1062 may further include, for example, a textual comment (such as "check this out" or "you can't miss this!"). In this implementation, if the my finds data block 1060 is the only data block that has been updated, the private metadata update 872 may consist solely of the data associated with these updated blocks.

At 880, the user of the UE 634 is notified of the shared announcement data. The notification at 880 may be analogous to the notification at 820, described above. Additionally or alternatively, the notification at 880 includes data relating to the updated private metadata associated with the UE 633 (received at 875). For example, the user of UE 634 may be enabled, based on the updated private metadata, to access the public announcement 712 and be notified that the user of UE 633 received the public announcement 712, shared it, commented on it, etc.

To return to the previous illustration, the user of 634 is notified (at 880) of the shoe retailer's public announcement 712 as a result of her sister's share instruction (at 740). Therefore, the user of 634 can, for example, access the public announcement 712 (which is identified in the updated private metadata of the user of UE 633) and see her sister's textual comment ("you can't miss this!").

From the perspective of the shoe retailer (the operator of the announcement device announcement device 670, as illustrated above), the flow diagrams depicted in FIG. 7 and FIG. 8 demonstrate targeted advertising that may not be achievable solely by transmission of the public announcement 712. The user of UE 634 may be just as interested in the shoe sale as the user of UE 633 (her sister, in the illustration). But if she is not, for whatever reason, monitoring public announcements that relate to shoe sales, then she will not be notified of the public announcement 712, even if she is within proximity of the announcement device 670. On the other hand, she may have received the public announcement 712 and hastily discarded it. If her sister later shares her discovery of the public announcement 712, the user of UE 634 may be inclined to reconsider the shoe sale. Finally, it is also possible to extend the geographic range of the public announcement 712. For example, the user of UE 634 may not be proximate to the announcement device 670. But the user of UE 634 may be proximate to the user of UE 633, who is proximate to the announcement device 670 (or was proximate somewhat recently). In this case, the shoe retailer may be able to use the public announcement 712 to reach potential customers who are not, strictly speaking, proximate to the announcement device 670.

FIG. 9 generally illustrates a signaling flow diagram 900 for sharing a discovery of a public announcement in accordance with an aspect of the disclosure. FIG. 9 shows the announcement device 670, UE 633, UE 634, and application server 690 depicted in FIG. 6.

FIG. 8 and FIG. 9 both depict a number of similar operations. The UE 634 in FIG. 9 requests the private metadata associated with UE 633 directly from the UE 633 itself, rather than from the application server 690 (as in FIG. 8)3. At 910, an announcing UE (for example, UE 633) transmits a private announcement 912. At 915, a monitoring UE (for example, UE 634) receives the private announcement 912 transmitted by the UE 633. At 920, the UE 634 optionally notifies the user of UE 634 of the received announcement 912, or notifies the user of UE 634 of data relating to the received announcement. At 930, the UE 634 optionally receives a retrieval instruction. After 930 is complete (or, if 920 and 930 are omitted, after 915 is complete), the signaling flow diagram 900 proceeds to 940. Each of these operations may be analogous to the operations 810, 815, 820, and 830, as described above with relation to FIG. 8.

At 940, the UE 634 requests private metadata from the UE 633. As noted above, based on some characteristic of the private announcement 812, the UE 634 has determined that UE 633 has updated private metadata. To return to a previous illustration, the UE 634 may recognize, for example, that the private announcement 812 includes a new find flag which has been activated. In order to obtain the new updated private metadata, the UE 634 transmits a private metadata request 942 to the UE 633. In some implementations, the private metadata request 942 is transmitted through a WAN. Additionally or alternatively, the private metadata request 942 is transmitted directly to UE 633 via ProSe communication, LTE-D, WiFi-direct, BTLE, or any other suitable protocol. At 845, the UE 633 receives the private metadata request 842.

The private metadata request 942 may include any data relevant to obtaining the private metadata of UE 633. For example, the private metadata request 942 may include an identification of the UE 633 (from which the private announcement 812 was received) and/or an identification of the UE 634 (which is transmitting the request). Additionally or alternatively, the private metadata request 942 may identify the specific metadata field or fields that are of interest. In some implementations, the private metadata request 942 is transmitted to the UE 633 using a direct P2P link such as direct P2P link 650 or direct P2P link 660. In other implementations, the private metadata request 942 is transmitted to the UE 633 using a wide area network connection (for example, Wi-Fi). In yet other implementations, the private metadata request 942 is transmitted to the UE 633 using network links such as network link 692.

At 950, the UE 633 authorizes the request. For example, the user of UE 633 may have determined to prevent a particular requesting party from obtaining his or her private metadata. In another example, the UE 633 may be configured, by default, to prevent all requesting parties from obtaining the private metadata associated with the user of UE 633, unless the user of UE 633 has given authorization. It will be understood that authorization may be verified in any suitable manner. In some implementations, the UE 633 has a record of requesting parties that are authorized to access the private metadata associate with the UE 633. In some implementations, an application installed on either or both of UE 633 and UE 634 facilitates authorization and/or assists in establishing a connection between UE 633 and UE 634 (for example, a direct P2P link such as direct P2P link 650 or direct P2P link 660). Once authorization has been completed, the server proceeds to 970.

At 970, the UE 633 transmits a private metadata update 972. The private metadata update 972 is sent to the UE 634 in response to the private metadata request at 940. At 975, the UE 634 receives the private metadata update 972 transmitted from the UE 633. As noted above, FIG. 10 shows an example of a private metadata structure 1000 in accordance with an aspect of the disclosure. The private metadata update 972 may include all of the data included in the private metadata 1010 or a portion of the private metadata 1010, for example, portions that have been updated. In some implementations, the private metadata update 972 is transmitted to the UE 633 using a direct P2P link such as direct P2P link 650 or direct P2P link 660. In other implementations, the private metadata update 972 is transmitted to the UE 633 using a wide area network connection (for example, Wi-Fi). In yet other implementations, the private metadata request 972 is transmitted to the UE 633 using network links such as network link 692. After the private metadata update 972 is received at 975, the signaling flow diagram 900 proceeds to 980. At 980, the user of the UE 634 is notified of the shared announcement data. The notification at 980 may be analogous to the notification at 880, as described above with relation to FIG. 8.

FIG. 10 generally illustrates a private metadata structure 1000 in accordance with an aspect of the disclosure. As noted above, the UE 633 may store private metadata such as private metadata structure 1000 locally on the UE 633. The private metadata structure 1000 stored on the UE 633 may comprise data relating to the UE 633 and/or the user of the UE 633. The user may be identified using, for example, a ProSe Code and Prose App ID tuple and/or an expression name and code. There may also be other metadata structures stored on UE 633 (similar to private metadata structure 1000) that include data relating to another UE or another user, for example, UE 634 or the user of UE 634. Additionally or alternatively, the application server 690 may store one or more metadata structures similar to private metadata structure 1000.

As shown in FIG. 10, the private metadata structure 1000 may include private metadata 1010 that is organized, for example, hierarchically. The private metadata structure 1000 may include a user name data block 1020, a gender data block 1030, a city of residence data block 1040, a likes data block 1050, a social media handle 1058, a my finds data block 1060, and a network information data block 1070. It will be understood that FIG. 10 is provided merely as an example of the types of data that might be included in private metadata, and that any of the data blocks 1020-1070 may be modified, differently organized within the hierarchical structure, or omitted entirely. Additionally or alternatively, other data blocks may be included in the private metadata structure 1000.

In the example private metadata structure 1000 of FIG. 10, the likes data block 1050 includes a first interest data block 1052, a second interest data block 1054, and a hobby data block 1056. The my finds data block 1060 includes a first shared my finds data block 1062 and a second shared my finds data block 1064. The network information data block 1070 includes an IP address data block 1072 and a port numbers data block 1074. It will be understood that FIG. 10 is provided merely as an example of the types of data that might be included in private metadata, and that any of the data blocks 1052, 1054, 1056, 1058, 1062, 1064, 1072, 1074 may be modified, differently organized within the hierarchical structure, or omitted entirely. Additionally or alternatively, other data blocks may be included in the private metadata structure 1000.

In some implementations, the my finds data block 1060 may be used to store the data associated with discovery sharing. As noted above, the UE 633 may transmit (at 750) discovery sharing data 752 to the application server 690. The discovery sharing data 752 may include a share instruction indicator that indicates that the user associated with UE 633 has shared a discovery. The share instruction indicator signal to the application server 690 that, for example, the my finds data block 1060 needs to be updated. The application server 690 may store such information at, for example, the first shared my finds data block 1062. The textual comment ("you can't miss this!") described in the foregoing illustrations may also be included in the first shared my finds data block 1062.

According to one possible example, the discovery sharing data 752 comprises a ProSe Application Code that was received in the public announcement 712 (along with the share instruction indicator described above). In another possible example, the discovery sharing data 752 comprises a ProSe Application ID. The UE 633 may recognize the ProSe Application ID based on the ProSe Application Code received in the public announcement 712. The ProSe Application ID may be known to the UE 633 based on a previous Match Report procedure, in which the ProSe Application ID was obtained from the ProSe function.

In either case, the my finds data block 1060 used to store the data associated with discovery sharing can identify the ProSe Application Code associated with the discovery to be shared, the ProSe Application ID associated with the discovery to be shared, or both.

FIG. 11 generally illustrates a public metadata structure 1100 in accordance with an aspect of the disclosure. The announcement device 670 may store public metadata such as public metadata structure 1100 locally on the announcement device 670. The public metadata structure 1100 stored on the announcement device 670 may comprise data relating to the announcement device 670 and/or the user of the announcement device 670. Additionally or alternatively, the application server 690 may store one or more metadata structures similar to public metadata structure 1100.

As shown in FIG. 11, the public metadata structure 1100 may include public metadata 1110 that is organized, for example, hierarchically. The public metadata structure 1100 may include a uniform resource identifier (URI) data block 1120, a business name data block 1125, a business description data block 1130, a street address data block 1140, a telephone number data block 1150, an event data block 1155, a geographic coordinates data block 1160, a map uniform resource locator (URL) data block 1170, a logo URL data block 1175, a payments accepted data block 1180, an hours of operation data block 1185, and a network information data block 1190. It will be understood that FIG. 11 is provided merely as an example of the types of data that might be included in private metadata, and that any of the data blocks 1120-1190 may be modified, differently organized within the hierarchical structure, or omitted entirely. Additionally or alternatively, other data blocks may be included in the public metadata structure 1100.

In the example public metadata structure 1100 of FIG. 11, the street address data block 1140 includes a first street address line data block 1142, a second street address line data block 1144, a locality data block 1146, and a zip code data block 1148. The geographic coordinates data block 1160 includes a latitude data block 1162, a longitude data block 1164, and an elevation data block 1166. The network information data block 1190 includes an IP address data block 1192 and a port numbers data block 1194. It will be understood that FIG. 11 is provided merely as an example of the types of data that might be included in public metadata, and that any of the data blocks 1142, 1144, 1146, 1148, 1162, 1164, 1166, 1192, 1194 may be modified, differently organized within the hierarchical structure, or omitted entirely. Additionally or alternatively, other data blocks may be included in the public metadata structure 1100.

It will be understood that the terms "public" and "private" are used solely for illustration. For example, it will be understood that in some implementations, the public announcement 712 may in fact be a private announcement, and that the private announcements 707, 792, 812, 912, may in fact be public announcements. In FIG. 7, FIG. 8, and FIG. 9, each announcement was referred to as either "public" or "private", but it will be understood that this is solely for the sake of illustration. In particular, an announcement of any variety (public, private, or otherwise) may be transmitted by announcement device 670, received, discovered, and shared by UE 633 in accordance with FIG. 7. Moreover, an announcement of any variety (public, private, or otherwise) may be updated by the application server 690 (at 770) and transmitted at by the UE 633 (at 705, 790, and/or 812).

It will also be understood that FIG. 10 and FIG. 11 are merely provided as examples of the kinds of metadata that might typically be stored by an entity that makes private announcements versus the types of data that might typically be stored by an entity that makes public announcements, respectively. Any reference in the present disclosure to "private metadata" or "public metadata" is purely illustrative, and may, in some implementations, be interpreted as a reference to metadata of any variety (public, private, or otherwise).

FIG. 12, FIG. 13, and FIG. 14 depict data that can be used during proximate discovery. As noted above, LTE-D technology can be used to facilitate proximate discovery of announcements and sharing of discoveries. It will be understood, however, that the foregoing operations can utilize any suitable P2P technology, including LTE-D, Wi-Fi Direct, Bluetooth Low Energy (BTLE), etc.

FIG. 12 generally illustrates a LTE-D discovery frame 1200 for proximate discovery in LTE-D. In some implementations, the announcements depicted in FIG. 7, FIG. 8, and FIG. 9 (707, 712, 792, 812, 912) may adopt the format of LTE-D discovery frame 1200. The LTE-D discovery frame 1200 may, by conforming to 3GPP standards, be a ProSe discovery frame.

LTE-D discovery frame 1200 includes a medium access control protocol data unit (MAC PDU) 1210 and a 24-bit cyclical redundancy check block 1220 that is added to the end of the MAC PDU 1210. The MAC PDU 1210 includes an 8-bit message type block 1230, a 184-bit ProSe Application Code block 1240, a 32-bit message integrity code block 1250, a 4-bit zero padding 1260, and a 4-bit time calibration block 1270. These bit quantities are provided purely for illustration, and are subject to modification. However, it will be understood that LTE-D discovery frame 1200, and discovery frames generally, are constrained in the amount of data that can be carried.

For example, the ProSe Application Code block 1240 may not be large enough to carry large amounts of metadata (such as the private metadata structure 1000 depicted in FIG. 10 or the public metadata structure 1100 depicted in 1100). In some implementations, a portion of the ProSe Application Code block 1240 may be reserved for an identification of the update status of the transmitting entity. As a result, the metadata associated with the entity that transmits the LTE-D discovery frame 1200 can be stored elsewhere (for example, on application server 690), and one or more bits reserved in the ProSe Application Code block 1240 can simply indicate when new metadata is available.

As noted above, one or more bits from the ProSe Application Code block 1240 can be reserved for a new find flag that, when activated, indicates that the transmitting entity wishes to share a discovery. Additionally or alternatively, one or more bits from the ProSe Application Code block 1240 can be reserved for a metadata version number, a timestamp for the most recent metadata update, and/or an identification number for the most recent metadata update. As a result, an entity that receives the LTE-D discovery frame 1200 can determine who transmitted the announcement based on the ProSe Application Code block 1240, and can also determine if new metadata is available.

FIG. 13 generally illustrates a Wi-Fi Direct discovery frame 1300 for proximate discovery in Wi-Fi Direct. In some implementations, the announcements depicted in FIG. 7, FIG. 8, and FIG. 9 (707, 712, 792, 812, 912) may adopt the format of Wi-Fi Direct discovery frame 1300.

Wi-Fi Direct discovery frame 1300 includes a 1-byte attribute ID block 1310, a 2-byte length block 1320, and 6-byte service ID block 1330, a 1-byte service control 1340, an optional 1-byte match filter length block 1350, a match filter 1355, an optional 1-byte service response filter length block 1360, a 1-byte service response filter 1365, a 1-byte service information length block 1370, and a variable-length service information block 1380. These bit quantities are provided purely for illustration, and are subject to modification. It will be understood that Wi-Fi Direct discovery frame 1300, like LTE-D discovery frame 1200, is constrained in the amount of data that can be carried. However, it will also be understood that Wi-Fi Direct discovery frame 1300 may be larger and not as constrained as the LTE-D discovery frame 1200. As a result, there is an increased probability that the metadata associated with the transmitting entity can be embedded directly within the Wi-Fi Direct discovery frame 1300, rather than stored on a remote server.

If the metadata associated with the entity that transmits the Wi-Fi Direct discovery frame 1300 can be embedded in the Wi-Fi Direct discovery frame 1300 itself (for example, in the service information block 1380), then a number of the operations shown in FIG. 8 and FIG. 9 can be omitted. For example, the UE 634, after receiving (at 815 in FIG. 8) the private announcement 812, may simply be able to translate the private announcement 812 into application-readable language that is then used to notify the user of shared announcement data (as in 880). However, if sufficient metadata cannot be embedded in a Wi-Fi Direct discovery frame

1300, then the metadata can be stored on a remote server, and one or more bits in the Wi-Fi Direct discovery frame 1300 (for example, the service information block 1380) can indicate the location or update status of the remotely-stored metadata in the same manner as shown in FIG. 8.

FIG. 14 generally illustrates a BTLE discovery frame 1400 for proximate discovery in BTLE. In some implementations, the announcements depicted in FIG. 7, FIG. 8, and FIG. 9 (707, 712, 792, 812, 912) may adopt the format of BTLE discovery frame 1400.

BTLE discovery frame 1400 includes a 1-byte preamble block 1410, a 4-byte access address block 1414, a 2-byte header block 1416, a 37-byte protocol data unit (PDU) payload block 1420, and a 3-byte cyclic redundancy check (CRC) block 1430. The payload 1420 may comprise, for example, a 6-byte advertisers address block 1440 and further advertising information block 1450. The advertising information block 1450 may further comprise distinct groupings of data, each identified by a 1-byte length block 1460, a 1-byte type block 1462, and a value block 1464. FIG. 14 shows two such groupings, the first comprising 1460, 1462, and 1464, the second comprising length block 1470, type block 1472, and value block 1474.

It will be understood that BTLE discovery frame 1400, like LTE-D discovery frame 1200 and Wi-Fi Direct discovery frame 1300, is constrained in the amount of data that can be carried. The BTLE discovery frame 1400 may be similar to Wi-Fi Direct discovery frame 1300 in that there is an increased probability that the metadata associated with the transmitting entity can be embedded directly within the BTLE discovery frame 1400, rather than stored on a remote server.

Likewise, if the metadata associated with the entity that transmits the Wi-Fi Direct discovery frame 1300 can be embedded in the BTLE discovery frame 1400 itself (for example, in the value block 1464, the value block 1474, etc.), then a number of the operations shown in FIG. 8 and FIG. 9 can be omitted. For example, the UE 634, after receiving (at 815 in FIG. 8) the private announcement 812, may simply be able to translate the private announcement 812 into application-readable language that is then used to notify the user of shared announcement data (as in 880). However, if sufficient metadata cannot be embedded in a BTLE discovery frame 1400, then the metadata can be stored on a remote server, and one or more bits in the BTLE discovery frame 1400 (for example, in the value block 1464, the value block 1474, etc.) can indicate the location or update status of the remotely-stored metadata in the same manner as shown in FIG. 8.

Those of skill in the art will appreciate that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Further, those of skill in the art will appreciate that the various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system Skilled artisans may implement the described functionality in varying ways for each particular application, but such implementation decisions should not be interpreted as causing a departure from the scope of the present invention.

The various illustrative logical blocks, modules, and circuits described in connection with the embodiments disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The methods, sequences and/or algorithms described in connection with the embodiments disclosed herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such that the processor can read information from, and write information to, the storage medium. In the alternative, the storage medium may be integral to the processor. The processor and the storage medium may reside in an ASIC. The ASIC may reside in a user terminal (e.g., UE). In the alternative, the processor and the storage medium may reside as discrete components in a user terminal.

In one or more exemplary embodiments, the functions described may be implemented in hardware, software, firmware, or any combination thereof. If implemented in software, the functions may be stored on or transmitted over as one or more instructions or code on a computer-readable medium. Computer-readable media includes both computer storage media and communication media including any medium that facilitates transfer of a computer program from one place to another. A storage media may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and blu-ray disc where disks usually reproduce data magnetically, while discs reproduce data optically with lasers. Combinations of the above should also be included within the scope of computer-readable media.

While the foregoing disclosure shows illustrative embodiments of the invention, it should be noted that various changes and modifications could be made herein without departing from the scope of the invention as defined by the appended claims. The functions, steps and/or actions of the method claims in accordance with the embodiments of the invention described herein need not be performed in any particular order. Furthermore, although elements of the invention may be described or claimed in the singular, the plural is contemplated unless limitation to the singular is explicitly stated.

What is claimed is:

1. A method for a mobile device to share a discovery, comprising:
   receiving a first announcement from an announcement device, wherein the first announcement is a public announcement associated with at least one of an identity, location, event or service, the identity, location, event or service being associated with the announcement device;
   notifying a user of the mobile device of the first announcement;
   after the notifying of the user, receiving a share instruction;
   generating discovery sharing data based on the received first announcement in response to the share instruction;
   transmitting the discovery sharing data to an external server;
   receiving an update indicator from the external server indicating that metadata associated with the mobile device has been updated; and
   generating a second announcement based on the update indicator.

2. The method of claim 1, wherein the public announcement comprises a ProSe discovery frame.

3. The method of claim 1, wherein:
   the notifying comprises transmitting a user notification to a user interface of the mobile device; and
   the receiving of the share instruction comprises receiving the share instruction from the user interface of the mobile device.

4. The method of claim 1, wherein:
   the received first announcement comprises an identification associated with the announcement device; and
   the generated discovery sharing data comprises the identification associated with the announcement device received in the first announcement and a share instruction indicator indicating that the share instruction has been received.

5. The method of claim 4, wherein:
   the notifying comprises transmitting a user notification to a user interface of the mobile device;
   the receiving of the share instruction comprises receiving the share instruction from the user interface of the mobile device; and
   the generated discovery sharing data further comprises contextual data, entered or attached via the user interface of the mobile device, relating to the share instruction.

6. The method of claim 1, further comprising transmitting the second announcement, wherein the second announcement is a private announcement associated with an identity associated with the mobile device.

7. The method of claim 6, wherein the private announcement comprises a ProSe discovery frame.

8. The method of claim 6, wherein the private announcement comprises an identification of the identity associated with the mobile device and a metadata update status indicator indicating one or more of (i) a metadata update timestamp, (ii) a metadata version number, (iii) a metadata update identification number, or (iv) any combination of (i), (ii), and (iii).

9. The method of claim 6, wherein the private announcement comprises an identification of the identity associated with the mobile device and a new find flag indicator indicating that the metadata associated with the mobile device includes discovery sharing data.

10. A mobile device, comprising:
    a processor configured to:
       receive a first announcement from an announcement device, wherein the first announcement is a public announcement associated with at least one of an identity, location, event or service, the identity, location, event or service being associated with the announcement device;
       notify a user of the mobile device of the first announcement;
       after the notifying of the user, receive a share instruction;
       generate discovery sharing data based on the received first announcement in response to the share instruction;
       transmit the discovery sharing data to an external server;
       receive an update indicator from the external server indicating that metadata associated with the mobile device has been updated; and
       generate a second announcement based on the update indicator; and
    a memory, coupled to the processor, to store related data and instructions.

11. The mobile device of claim 10, wherein the public announcement comprises a long term evolution direct (LTE-D) discovery frame.

12. The mobile device of claim 10, wherein to notify the user, the processor is further configured to transmit a user notification to a user interface of the mobile device, and to receive the share instruction, the processor is further configured to receive the share instruction from the user interface of the mobile device.

13. The mobile device of claim 10, wherein:
    the received first announcement comprises an identification associated with the announcement device; and
    the generated discovery sharing data comprises the identification associated with the announcement device received in the first announcement and a share instruction indicator indicating that the share instruction has been received.

14. The mobile device of claim 13, wherein:
    to notify the user, the processor is further configured to transmit a user notification to a user interface of the mobile device;
    to receive the share instruction, the processor is further configured to receive the share instruction from the user interface of the mobile device; and
    the generated discovery sharing data further comprises contextual data, entered or attached via the user interface of the mobile device, relating to the share instruction.

15. The mobile device of claim 10, wherein the processor is further configured to transmit the second announcement, wherein the second announcement is a private announcement associated with an identity associated with the mobile device.

16. The mobile device of claim 15, wherein the private announcement comprises a long term evolution direct (LTE-D) discovery frame.

17. The mobile device of claim 15, wherein the private announcement comprises an identification of the identity associated with the mobile device and a metadata update status indicator indicating one or more of (i) a metadata update timestamp, (ii) a metadata version number, (iii) a metadata update identification number, or (iv) any combination of (i), (ii), and (iii).

18. The mobile device of claim 15, wherein the private announcement comprises an identification of the identity associated with the mobile device and a new find flag indicator indicating that the metadata associated with the mobile device includes discovery sharing data.

19. An apparatus for sharing a discovery, comprising:
means for receiving a first announcement from an announcement device, wherein the first announcement is a public announcement associated with at least one of an identity, location, event or service, the identity, location, event or service being associated with the announcement device;
means for notifying a user of a mobile device of the first announcement;
means for receiving a share instruction after the notifying of the user;
means for generating discovery sharing data based on the received first announcement in response to the share instruction;
means for transmitting the discovery sharing data to an external server;
means for receiving an update indicator from the external server indicating that metadata associated with the mobile device has been updated; and
means for generating a second announcement based on the update indicator.

20. The apparatus of claim 19, wherein:
the received first announcement comprises an identification associated with the announcement device; and
the generated discovery sharing data comprises the identification associated with the announcement device received in the first announcement and a share instruction indicator indicating that the share instruction has been received.

21. The apparatus of claim 19, further comprising:
means for transmitting the second announcement, wherein the second announcement is a private announcement associated with an identity associated with the mobile device.

22. The apparatus of claim 21, wherein the private announcement comprises an identification of the identity associated with the mobile device and a metadata update status indicator indicating one or more of (i) a metadata update timestamp, (ii) a metadata version number, (iii) a metadata update identification number, or (iv) any combination of (i), (ii), and (iii).

23. The apparatus of claim 21, wherein the private announcement comprises an identification of the identity associated with the mobile device and a new find flag indicator indicating that the metadata associated with the mobile device includes discovery sharing data.

24. A non-transitory computer-readable medium comprising code, which, when executed by a processor, causes the processor to perform operations for sharing a discovery, the non-transitory computer-readable medium comprising:
code for receiving a first announcement from an announcement device, wherein the first announcement is a public announcement associated with at least one of an identity, location, event or service, the identity, location, event or service being associated with the announcement device;
code for notifying a user of a mobile device of the first announcement;
code for receiving a share instruction after the notifying of the user;
code for generating discovery sharing data based on the received first announcement in response to the share instruction;
code for transmitting the discovery sharing data to an external server;
code for receiving an update indicator from the external server indicating that metadata associated with the mobile device has been updated; and
code for generating a second announcement based on the update indicator.

25. The non-transitory computer-readable medium of claim 24, wherein:
the received first announcement comprises an identification associated with the announcement device; and
the generated discovery sharing data comprises the identification associated with the announcement device received in the first announcement and a share instruction indicator indicating that the share instruction has been received.

26. The non-transitory computer-readable medium of claim 24, further comprising:
code for transmitting the second announcement, wherein the second announcement is a private announcement associated with an identity associated with the mobile device.

27. The non-transitory computer-readable medium of claim 26, wherein the private announcement comprises an identification of the identity associated with the mobile device and a metadata update status indicator indicating one or more of (i) a metadata update timestamp, (ii) a metadata version number, (iii) a metadata update identification number, or (iv) any combination of (i), (ii), and (iii).

28. The non-transitory computer-readable medium of claim 26, wherein the private announcement comprises an identification of the identity associated with the mobile device and a new find flag indicator indicating that the metadata associated with the mobile device includes discovery sharing data.

* * * * *